US006502718B2

(12) United States Patent
Fitzgerald et al.

(10) Patent No.: US 6,502,718 B2
(45) Date of Patent: Jan. 7, 2003

(54) GARMENT DISPENSING AND RECEIVING APPARATUS HAVING A REMOVABLE CARTRIDGE BODY AND A FLEXIBLE DISPENSING DOOR

(75) Inventors: Robert M. Fitzgerald, Norcross, GA (US); Ward P. Broom, Snellville, GA (US); Warren Lee Williams, Grayson, GA (US)

(73) Assignee: Innovative Product Achievements, Inc., Duluth, GA (US)

( * ) Notice: Subject to any disclaimer, the term of this patent is extended or adjusted under 35 U.S.C. 154(b) by 16 days.

(21) Appl. No.: 09/812,041

(22) Filed: Mar. 19, 2001

(65) Prior Publication Data

US 2002/0130135 A1 Sep. 19, 2002

(51) Int. Cl.[7] .............................................. B65G 59/00
(52) U.S. Cl. ......................................... 221/131; 312/42
(58) Field of Search ........................... 221/1, 7, 13, 92, 221/131, 130, 125, 197, 76; 312/215, 10, 42, 45, 49

(56) References Cited

U.S. PATENT DOCUMENTS

| | | | |
|---|---|---|---|
| 165,252 | A | 7/1875 | Pike |
| 2,446,807 | A | 8/1948 | Blair et al. |
| 2,478,815 | A | 8/1949 | Forman |
| 2,653,693 | A | 9/1953 | Dosberg |
| 2,766,906 | A | 10/1956 | Bookout et al. |
| 2,888,307 | A | 5/1959 | Graves et al. |
| 2,986,304 | A | 5/1961 | Barnhart |
| 3,010,608 | A | 11/1961 | Lyons |
| 3,249,294 | A | 5/1966 | Hughes et al. |
| 3,455,621 | A | 7/1969 | Kingsley |
| 3,486,658 | A | 12/1969 | Cheslak et al. |
| 3,489,315 | A | 1/1970 | Craven, Jr. et al. |
| 3,696,737 | A | 10/1972 | Wikner |
| 3,728,849 | A | 4/1973 | Lundahl |
| 3,752,061 | A | 8/1973 | Hirsch |
| 3,893,588 | A | 7/1975 | Patrick |
| 4,008,827 | A | 2/1977 | Appelbaum et al. |
| 4,519,308 | A | 5/1985 | Eberle |
| 4,522,061 | A | 6/1985 | Hochreuther et al. |
| 4,552,061 | A | 11/1985 | Brutsman |
| 4,594,942 | A | 6/1986 | Denneboom |
| 4,788,909 | A | 12/1988 | Stewart |
| 4,807,779 | A | 2/1989 | Clapper |
| 4,869,395 | A | 9/1989 | Rubbmark |
| 4,896,593 | A | 1/1990 | Slusser |
| 4,967,928 | A | 11/1990 | Carter |
| 4,993,591 | A | 2/1991 | Schock |
| 5,067,630 | A | 11/1991 | Nesser et al. |
| 5,385,265 | A | 1/1995 | Schlamp |
| 5,638,985 | A | 6/1997 | Fitzgerald et al. |
| 5,713,270 | A | 2/1998 | Fitzgerald et al. |
| 5,829,349 | A | 11/1998 | Fitzgerald et al. |

*Primary Examiner*—Kenneth W. Noland
(74) *Attorney, Agent, or Firm*—Alston & Bird LLP

(57) ABSTRACT

A dispenser for dispensing articles such as scrub garments. The dispenser includes a housing that defines an interior portion, a foldable, wheeled distribution cartridge defining an orthogonal array of receptacles for receiving items to be distributed from the dispenser; and a main door for controlling access to the interior of each of the various receptacles. The main door defines a plurality of rectangular horizontal openings, each of which aligns with a horizontal row of receptacles within the distribution cartridge. Access to each of these horizontal openings is controlled by a lockable main door. A flexible receptacle door having a vertical opening is mounted on mechanically-driven rollers on the interior of the main door. The receptacle door may be moved laterally relative to the receptacles so that the vertical opening aligns with any column of receptacles within the distribution cartridge. The dispenser allows a user access to the interior of a target receptacle while simultaneously preventing access to all other receptacles in the cartridge by laterally aligning the vertical access slot of the receptacle door with the target receptacle and then unlocking only the user door that covers the row of receptacles that includes the target receptacle. The user may then open the user door and reach through the exposed horizontal opening in the main door and through the vertical slot in the receptacle door to remove an article from within the interior of the target receptacle.

52 Claims, 15 Drawing Sheets

GARMENT DISPENSING AND RECEIVING APPARATUS HAVING A REMOVABLE CARTRIDGE BODY AND A FLEXIBLE DISPENSING DOOR

FIELD OF THE INVENTION

This invention relates to machines for vending or dispensing discrete articles, and more particularly relates to an apparatus and a method for dispensing articles such as healthcare scrub suits and other textile products.

BACKGROUND OF THE INVENTION

Scrub suits (or "scrubs") are uniforms typically worn by doctors, nurses, and other medical workers in hospital operating rooms or other locations where the workers are likely to be in immediate proximity with patients. Scrubs provide an easily-changed launderable barrier between the wearer and the patient, helping to prevent the patient from being exposed to germs or potential infectants on the wearer's body or street clothing, and also helping to protect the wearer's body from direct physical contact with a patient.

Scrubs are usually two-piece garments consisting of a shirt and pants. The shirts and pants are stocked in different sizes to accommodate the needs of individual wearers. Although soiled scrubs are collected for laundering and subsequent reuse, the scrubs must be periodically replaced due to the wear and tear encountered in normal use.

Hospitals normally make scrubs available to doctors and other medical workers at no cost to those workers. Although each user is supposed to have only a limited number of scrubs at any given time, some users tend to hoard scrubs of their size to maintain their own personal reserve. Other users may appropriate extra sets of scrubs for their own personal use, at home or elsewhere outside the hospital. These and other improper uses of scrubs contribute to an unacceptable reduction in most hospitals' inventories of scrubs.

Some hospitals try to control the distribution of scrubs by requiring users to check out scrubs from personnel at central locations. Using this approach, each authorized individual is permitted to have no more than a certain number of scrubs in his or her possession at any time. The individual must return soiled scrubs to receive credit for clean scrubs. Although this approach can help to solve the problems mentioned above, the approach is expensive to implement because it requires paying employees to distribute the garments twenty-four hours a day, seven days a week.

It has been proposed to overcome the foregoing problems by dispensing scrubs from a vending machine. However, standard vending machines are not ideal for dispensing scrubs. These vending machines, which store items on deep shelves and which dispense items by pushing the items individually over the edge of the shelves so that the items fall into a receiving bin, are too bulky to be placed in hallways or other locations where scrubs dispensers are needed.

Another common kind of vending machine is the so-called pinwheel machine. Items to be vended are received in compartments on a pinwheel or carousel within the machine, and each item is given access to an exit door by turning the pinwheel to place the item in front of the door. Like the standard vending machines discussed above, these machines also have a size disadvantage because at least two dimensions of the machine (for example, depth and width) must be the same to accommodate the round pinwheel.

Another known kind of vending machine for dispensing surgical scrubs is described in our U.S. Pat. No. 5,638,985, which is incorporated herein by reference. Such vending machines include an array of interior receptacles, each of which may be loaded with a set of surgical scrubs. Access to these interior receptacles is controlled by both a series of rigid vertical slats positioned in front of the receptacles and a column of horizontal doors positioned in front of the slats. In order to dispense scrubs from a particular receptacle, the vending machine uses a "slot access mechanism" disposed within the interior of the vending machine to push the slats in front of the receptacle apart so that they do not block access to the receptacle. This allows a user to access the receptacle through one of the horizontal user doors. Alternatively, the rigid vertical slats may be replaced by a movable panel having a single opening equal in width to a single slot, which may be positioned within the vending machine so that the opening becomes aligned with a particular slot.

Despite the success of the vending machine taught in our U.S. Pat. No. 5,638,985, it is mechanically more complex than the proposed machine. But perhaps more importantly, because the receptacles and "slot access mechanism" are permanently affixed within the interior of the vending machine taught in U.S. Pat. No. 5,638,985, in order to load the receptacles, an operator must transport a stack of scrubs to the vending machine and load the vending machine at the location of the dispenser in the hospital. Additionally, while the dispenser is being loaded, it is "out of service". Therefore, reducing the time it takes to load a dispenser is of value.

Thus, there is a need in the art for a dispenser for dispensing surgical scrubs and other items that is compact, relatively simple in mechanical structure, and that may be loaded at a more convenient location such as the laundry.

SUMMARY OF THE INVENTION

The present invention seeks to provide a compact dispensing apparatus and method that contains relatively few moving parts, that is inexpensive to manufacture and repair, and that may be loaded at a convenient location. The present invention accomplishes this by providing an array of receptacles for receiving goods to be vended, and a receptacle door that is disposed adjacent to the array of receptacles and that comprises at least one sheet of flexible material. The receptacle door is mounted for movement relative to the array of receptacles and defines an access region that selectively allows access to an interior of one or more of the receptacles while simultaneously blocking access to an interior portion of the other receptacles in the array.

The present invention further includes a drive apparatus for moving the receptacle door relative to the array of receptacles so that the receptacle door permits access to an interior of a selected target receptacle. A main door is mounted to normally prevent access to the access region of the receptacle door. This main door is controlled by a control mechanism that is operable automatically to enable access to the access region of the receptacle door after the receptacle door has been moved to permit access to the interior of the target receptacle.

In a preferred embodiment of the invention, the array of receptacles is an orthogonal array of receptacles having a plurality of adjacent horizontal rows and vertical columns of receptacles. In this embodiment of the invention, the receptacle door defines a vertical opening having a width that corresponds to the width of one or more of the individual receptacles. The drive apparatus is configured to move the receptacle door to a first position in which the vertical opening is substantially aligned with an opening in a first target receptacle in one of the horizontal rows of receptacles. In this position, the receptacle door blocks access to the interiors of all of the receptacles within that row of receptacles except the first target receptacle. The drive mechanism may later move the receptacle door horizontally along the row of receptacles so that the vertical opening is substantially aligned with an opening in a second target receptacle in the row of receptacles. In this position, the receptacle door blocks access to the interiors of all of the receptacles within the row of receptacles except the second target receptacle.

In a preferred embodiment of the invention, the receptacle door is mounted on the main door, and one end of the receptacle door's flexible material is partially wound on a first roller that is operable to move the receptacle door relative to the array of receptacles. Another end of the receptacle door's flexible material is preferably wound partially around a second roller so that the receptacle door extends between the first roller and the second roller and so that a portion of the receptacle door may be moved relative to the first and second rollers by rotating at least one of the rollers. In this preferred embodiment of the invention, the drive apparatus is reversible, and is mounted to drive at least one of the rollers via a worm gear. The worm gear is selected to allow the receptacle door to be held securely in place so that a user cannot move the flexible door. Alternatively, an electromechanical clutch on a helical gear drive may be used in place of the worm gear.

As noted above, the apparatus includes a main door for controlling access to the access region of the receptacle door. More specifically, the main door defines a rectangular opening having a plurality of horizontal portions, and may be positioned relative to the receptacles so that each of the horizontal portions of the rectangular opening is aligned with a corresponding row of receptacles. The main door also preferably includes one or more lockable user doors, each of which is positioned to cover one of the horizontal portions of the rectangular opening in the main door. In this embodiment of the invention, each user door is operable to control access to one of the rows of receptacles. Thus, the system can block access to all rows of receptacles other than a target row by locking all user doors except for the user door corresponding to the target row.

Similarly, the receptacle door is operative to control access to at least one of the columns of receptacles. For example, the receptacle door may be moved from a first position, in which the vertical opening in the receptacle door blocks access to a target column of receptacles, to a second position, in which the vertical opening in the receptacle door aligns with the target column of receptacles. In this second position, the receptacle door blocks access to all of the columns of receptacles other than the target column of receptacles. Thus, as is explained in greater detail below in regard to a preferred embodiment of the invention, the user door and the receptacle door may combine to block access to all receptacles other than a target receptacle.

The dispenser may include a control mechanism that is operative to orchestrate the distribution of articles from the receptacles. The control mechanism accomplishes this by accepting a request for a particular article from a user, and then providing the user with access to an appropriate article by: (1) identifying a target receptacle that contains an article that meets the criteria of a particular user's request; (2) driving the motor so that the vertical opening within the receptacle door is aligned with a target column of receptacles containing the target receptacle; and (3) unlocking the user door that is aligned with the row of receptacles containing the target receptacle.

The present invention also seeks to provide a compact dispensing apparatus having an interior cartridge that may be remotely loaded and wheeled into operative engagement with the dispenser. The present invention accomplishes this in an embodiment that includes a housing that is disposed on a surface and that defines a main door that opens to expose a recess in the housing that is open to the surface. This main door defines one or more user doors. This embodiment of the invention further includes a removable cartridge that is sized to fit in the recess and that defines one or more receptacles accessible through the user door or doors. The removable cartridge is mounted on a rolling mechanism for movement along the surface from outside the recess into the recess and into a position in which the main door can be closed and in which the cartridge is positioned to align the receptacles with the user door or doors.

In a preferred embodiment of the invention, the cartridge comprises a first open-faced box that is connected to a second open-faced box via a hinge. A series of horizontal and vertical divider members are disposed within the interior of each of the boxes to create an orthogonal array of preferably equally-sized receptacles of rectangular cross-section and that are accessible only through the open-faced portions of the boxes. These receptacles are used to receive articles to be dispensed from the dispenser. The two open-faced boxes are of similar size and shape and are configured to be moved into a "closed" position, in which the front edges of the ceilings, floors, and side walls of the boxes abut one another. In this position, the first and second boxes combine to form a closed combined box that does not permit access to the interior of the box. The cartridge includes a lock for locking the first and second open-faced boxes into this closed position.

The first and second open-faced boxes are also configured to be rotated into an "open" position in which the open faces of the first and second boxes are immediately adjacent to one another and lie in the same plane. In this open position, access is provided to each of the receptacles within the cartridge through the open faces of the boxes.

To use a preferred embodiment of the dispenser, an operator at a central loading facility first moves an empty cartridge into the "open" position so that all of the receptacles within the cartridge are exposed. The operator then loads an article to be dispensed (such as a set of surgical scrubs) into each of the receptacles, moves the cartridge into the closed position, and locks the cartridge closed. Locking the cartridge in the closed position ensures that no articles will be removed from the cartridge between the time that the cartridge is loaded and the time that the cartridge is opened for insertion into the dispenser.

After loading and locking the cartridge, the operator wheels the cartridge to a remote dispenser. The operator then unlocks and opens the dispenser's main door to expose the interior of the housing, wheels the used cartridge out of the interior of the housing and locks the used cartridge into the closed position. Next, the operator unlocks and opens the loaded cartridge and wheels the cartridge into operable engagement with the interior of the dispenser's housing. The operator then programs the control mechanism to indicate the contents of the cartridge's receptacles, closes and locks the main door, and wheels the empty cartridge to the central loading facility for re-loading.

After the dispenser has been properly loaded, a user may request a particular type of item by entering a request via the control mechanism. The control mechanism then reviews the dispenser's pre-programmed memory and identifies a target receptacle containing an item that meets the criteria entered by the user. The control mechanism then drives the drive mechanism to move the receptacle door laterally until the vertical opening in the receptacle door is aligned with a target column of cartridges that includes the target receptacle. Once the opening has been properly aligned, the receptacle door prevents access to the interior of all of the receptacles that are not within the target column of receptacles.

Next, the control mechanism unlocks a target user door that is aligned with the row of receptacles that contains the target receptacle. Once the user door is unlocked, the user potentially has access to all receptacles within the row of receptacles with which the user door is aligned. Access to all other receptacles within the cartridge is blocked by the other user doors, which remain locked.

After the user door is unlocked, the user may open the user door to reveal the horizontal region of the receptacle door that is immediately adjacent the exposed horizontal opening in the main door. Because the receptacle door is positioned so that its vertical opening is aligned with the target receptacle, the receptacle door prevents access to each receptacle in the target row of receptacles except the target receptacle. Thus, the user door and the receptacle door combine to block access to all receptacles other than the target receptacle. A user may remove the contents of the target receptacle through the exposed horizontal opening in the main door and through the vertical opening in the receptacle door. After the item is removed and the user closes the user door, the control mechanism re-locks the user door and moves the receptacle door into a home position in preparation for dispensing an item to a next user.

In an alternative embodiment of the invention, the various receptacles within one or more of the various rows of receptacles are wider than the receptacles in other rows of receptacles within the cartridge. This allows the dispenser to dispense items of differing sizes. In such an embodiment of the invention, the vertical opening in the receptacle door is not rectangular, but rather contains portions with varying widths that correspond to the various widths of the receptacles.

In another embodiment of the invention, the receptacle door is provided with a plurality of vertical plastic support slats that are sewn or riveted into the receptacle door and that are spaced apart along the length of the receptacle door. These support slats extend between slots that are adjacent the upper and lower edges of the main door. The slats serve to keep the receptacle door from drooping under its own weight or from being pushed down or up by someone trying to gain access to receptacles that are normally covered by the receptacle's door.

In another embodiment of the invention, the receptacle door comprises a single sheet of flexible material defining one or more individual access holes that align with each row of receptacles within the cartridge. To dispense an item from the dispenser, an individual access hole is positioned over the target receptacle and the user door covering the row of receptacles in which the target receptacle is located is unlocked to provide access to the interior of the target receptacle through the access hole.

In a further embodiment of the invention, the receptacle door comprises a single sheet of flexible material (such as ballistic nylon) having individual access holes as described above. In this embodiment, however, the first and second rollers are positioned horizontally on the interior of the main door so that the first roller is positioned adjacent the top edge of the main door and so that the second roller is positioned adjacent the bottom edge of the main door. As in the embodiment of the invention in which the rollers are vertically oriented, the receptacle door extends around and between the rollers so that a portion of the receptacle door may be moved relative to the rollers by rotating the rollers. To dispense an item from the dispenser, an individual access hole is positioned over the target receptacle and the user door covering the row of receptacles in which the target receptacle is located is unlocked to provide access to the interior of the target receptacle through the access hole.

In yet another embodiment of the invention, the cartridge includes a series of horizontal shelves that are configured to receive packages of articles to be dispensed from the dispenser. These packages are divided by internal dividers into individual receptacles, which are loaded with articles prior to shipping. This allows the operator to load a whole row of the cartridge by simply removing the top of the package to expose the individual articles stored within their individual receptacles, and then placing the open package on the appropriate horizontal shelf. This significantly reduces the time required to load the cartridge.

In a further embodiment of the invention, the dispenser includes at least one "receptacle full" sensor for determining whether the various receptacles within the cartridge contains an article to be dispensed. In a preferred embodiment of the invention, each of these sensors is mounted on the receptacle door adjacent a corresponding row of the receptacles. In this preferred embodiment of the invention, each sensor is positioned so that it may be moved along a row of receptacles to determine whether each receptacle in that row contains an article.

BRIEF DESCRIPTION OF THE DRAWINGS

Figure 1A:
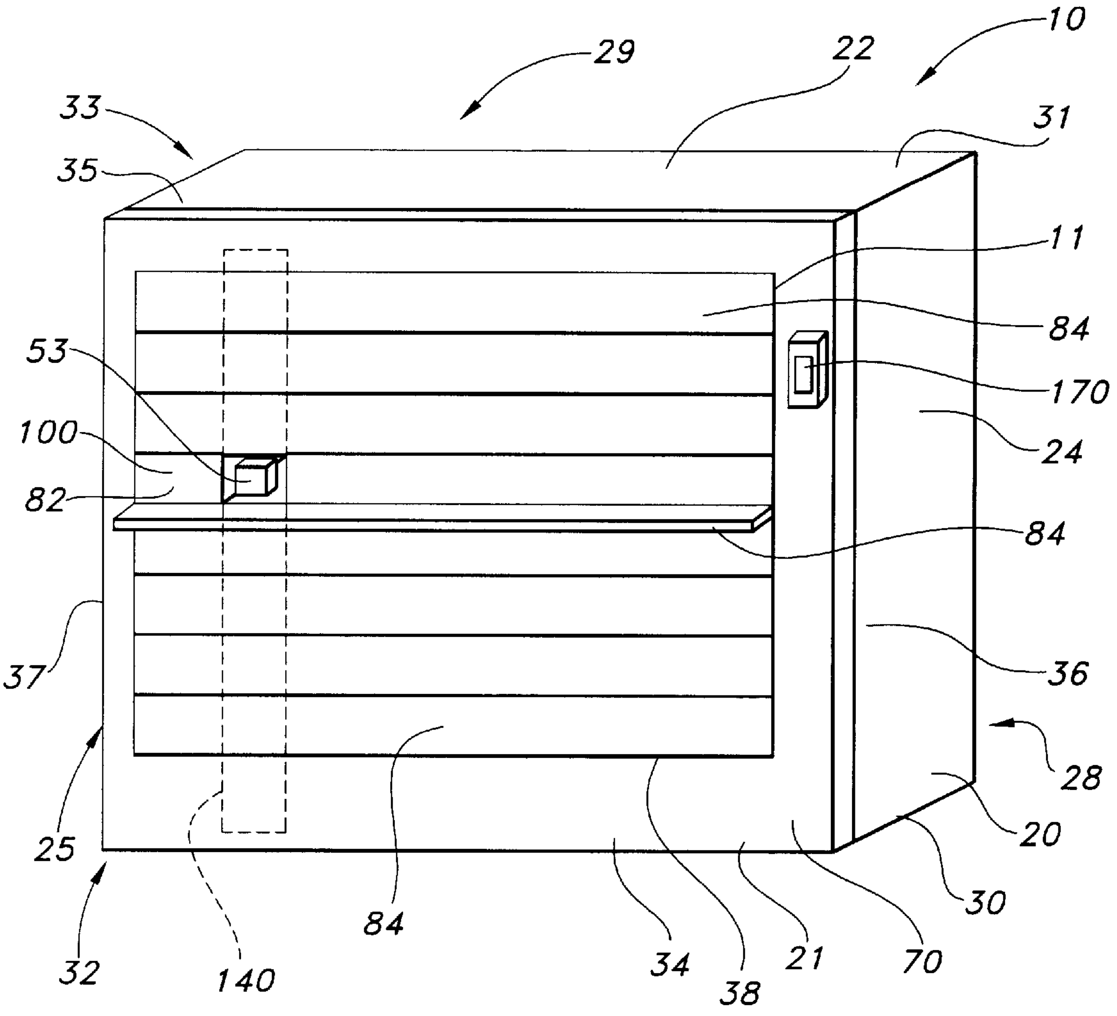

Having thus described the invention in general terms, reference will now be made to the accompanying drawings, which are not necessarily drawn to scale, and wherein:

FIG. 1A is a pictorial front view of a dispenser according to a preferred embodiment of the present invention, in which the main door is shown closed.

Figure 1B:
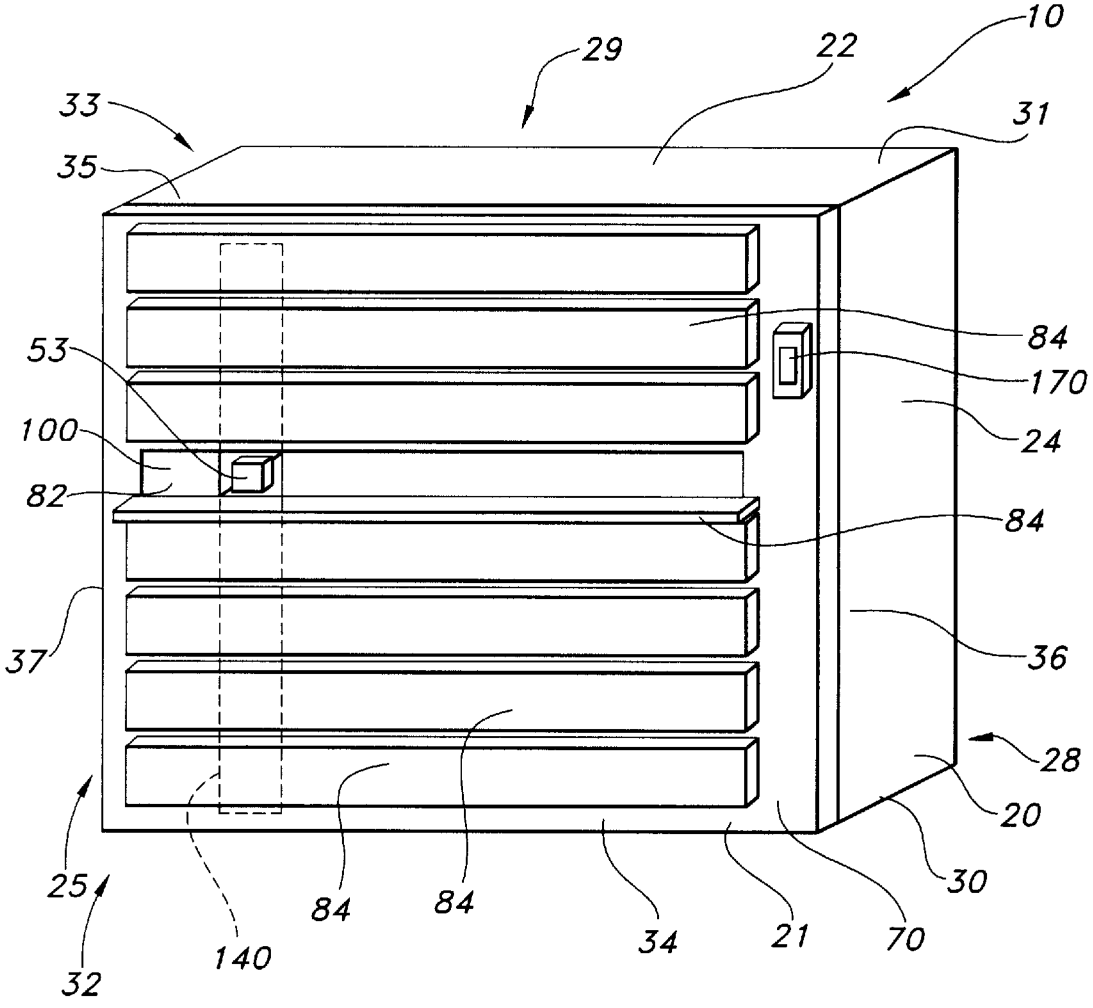

FIG. 1B is a pictorial front view of a dispenser according to an alternative embodiment of the present invention, in which the main door is shown closed.

Figure 2:
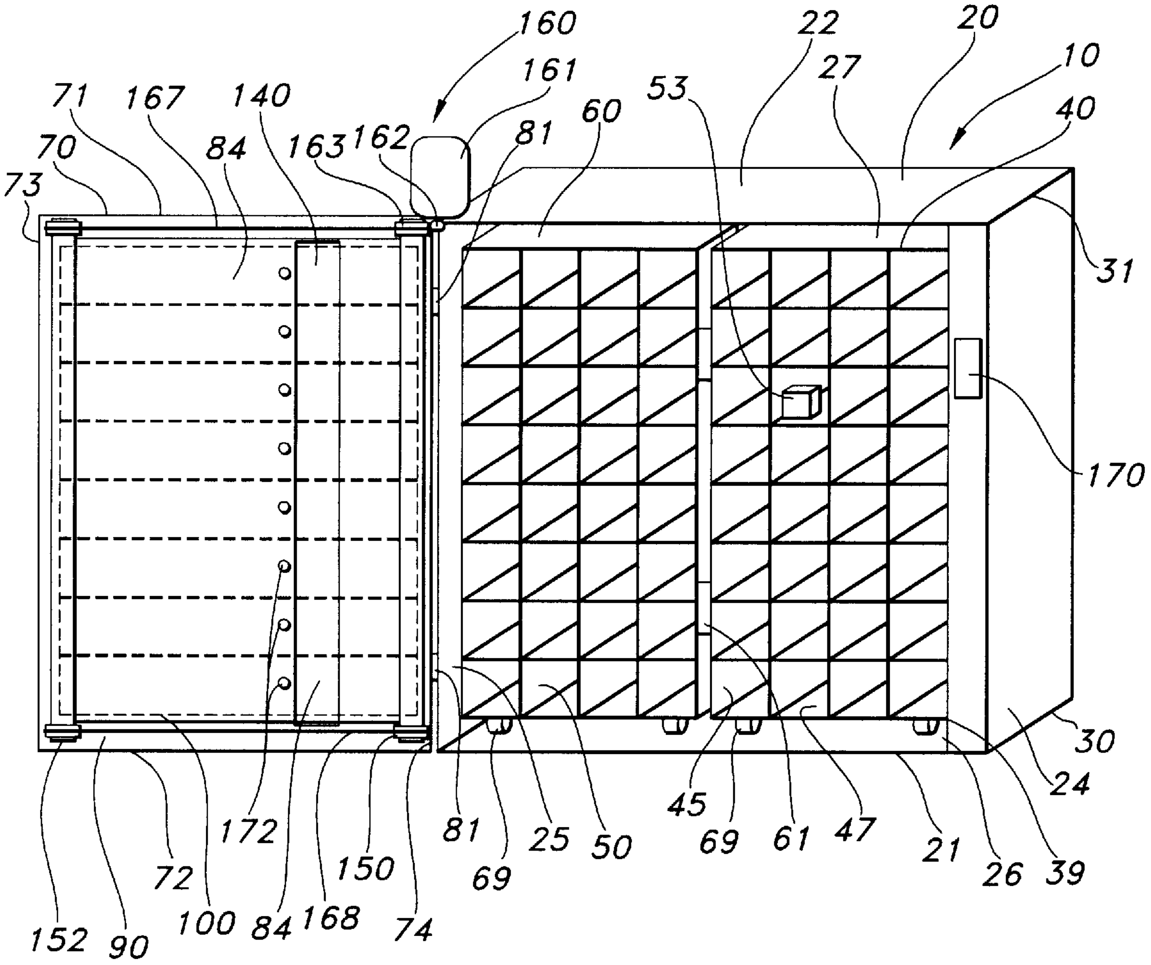

FIG. 2 is a pictorial front view of the dispenser shown in FIG. 1A, in which the main door is shown open.

Figure 3:
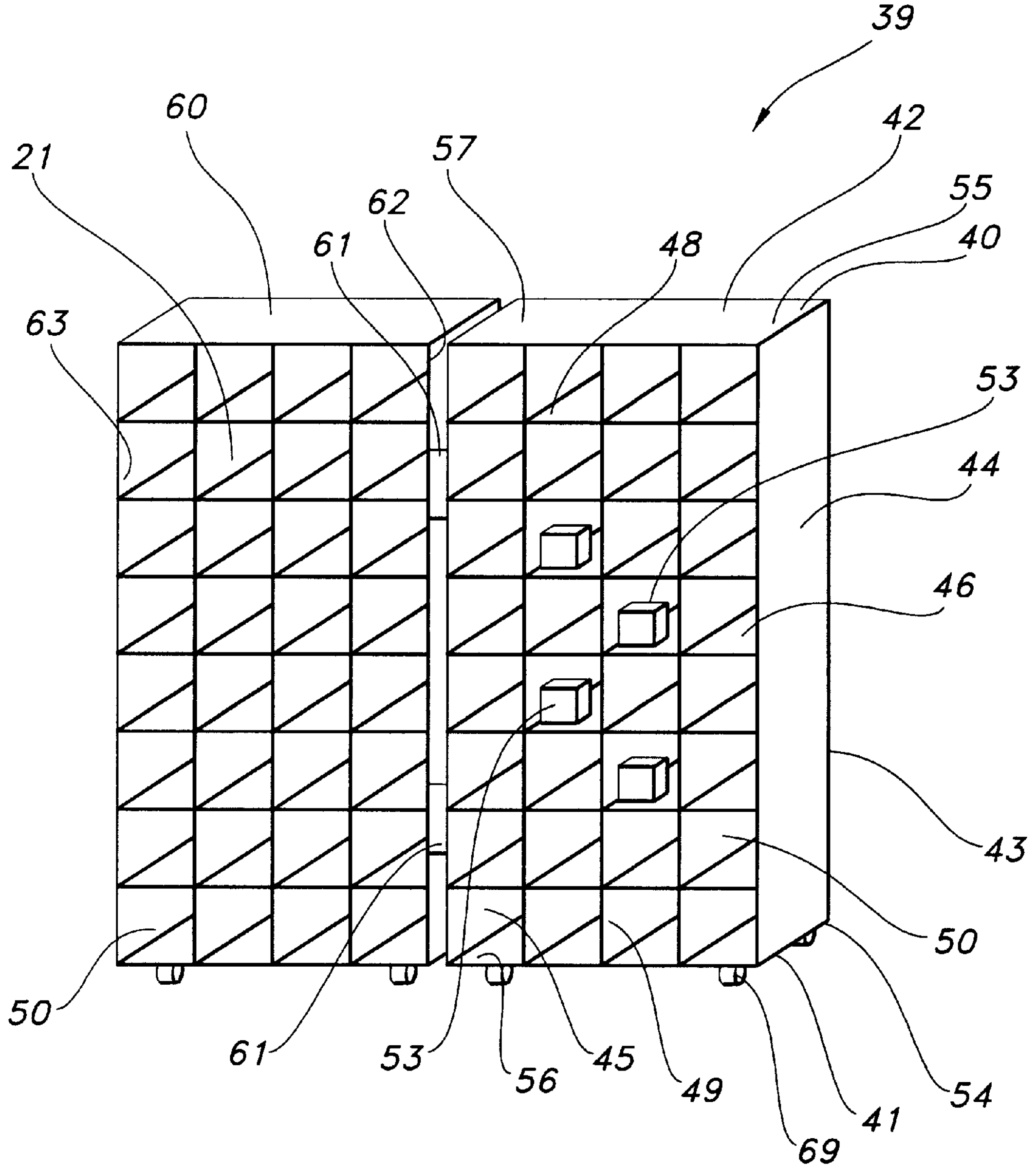

FIG. 3 is a pictorial front view of the cartridge of the dispenser of FIG. 1A.

Figure 4:
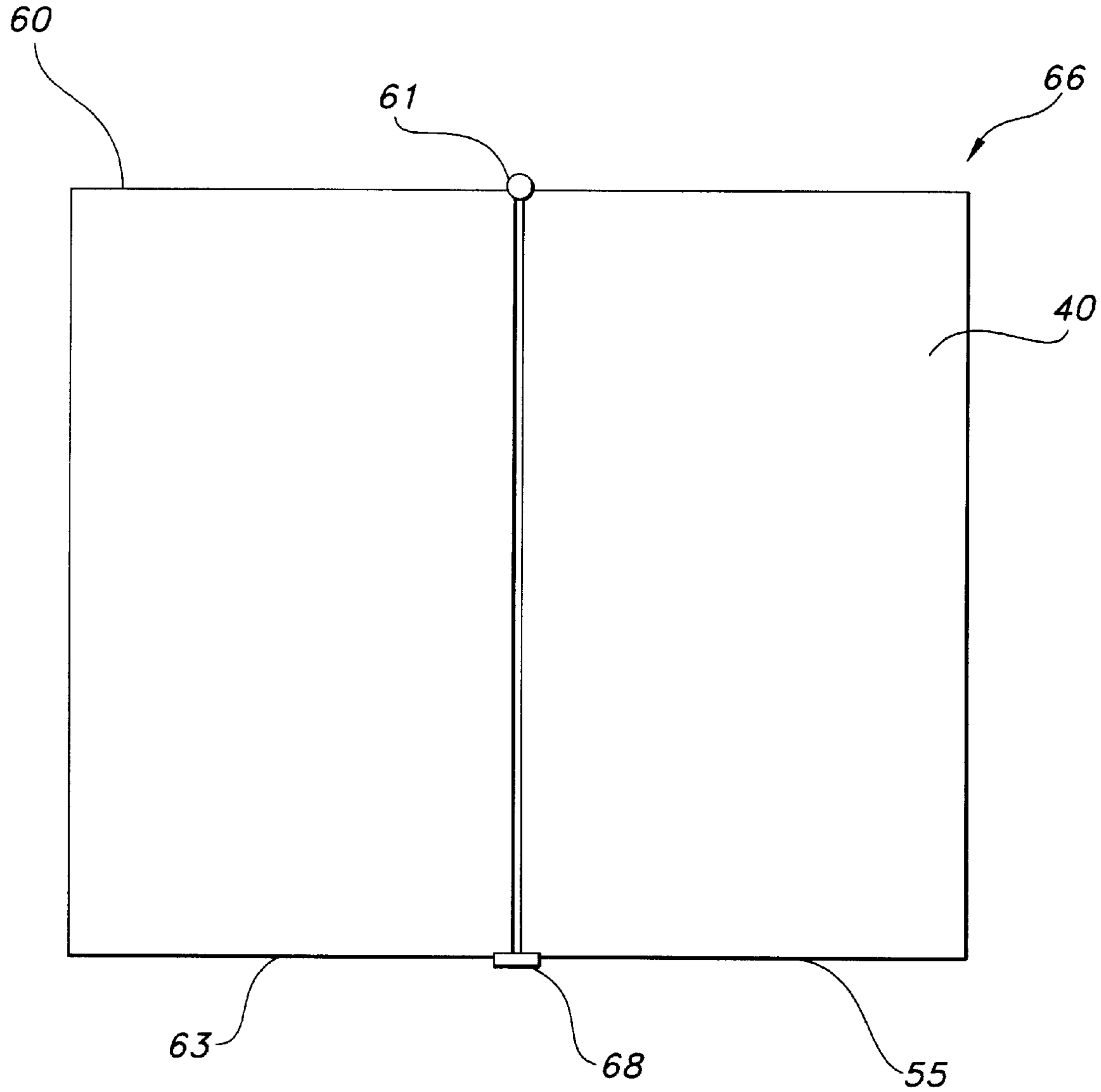

FIG. 4 is a top view of the cartridge of FIG. 3, in which the cartridge is in the closed position.

Figure 5:
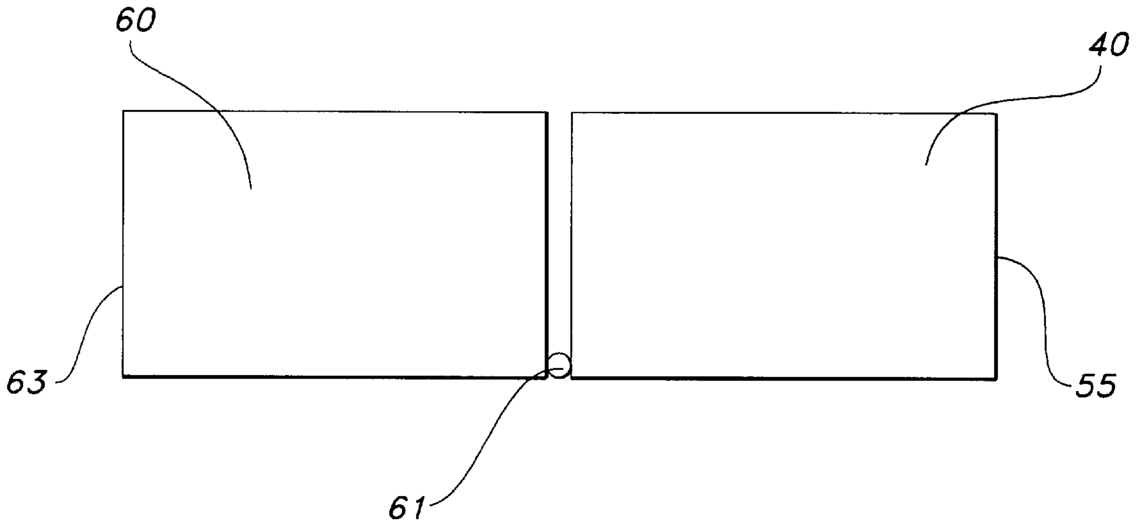

FIG. 5 is a top view of the cartridge of FIG. 3, in which the cartridge is in the open position.

Figure 6A:
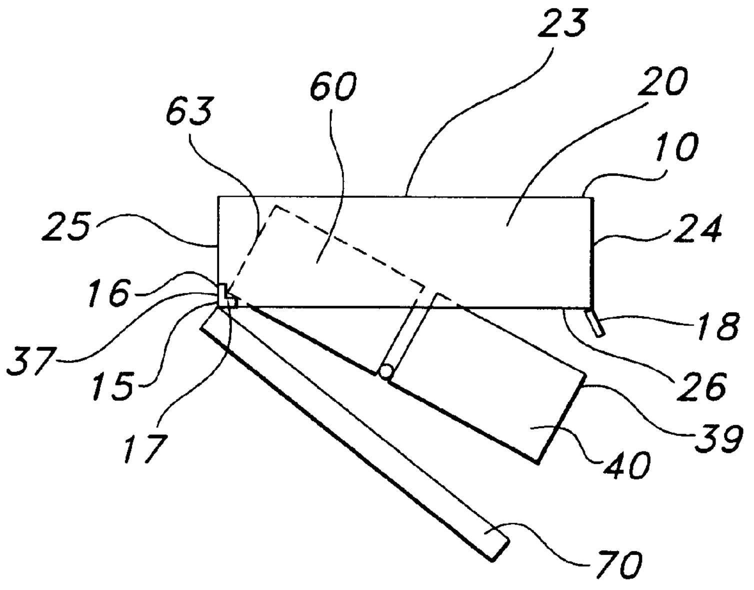
Figure 6B:
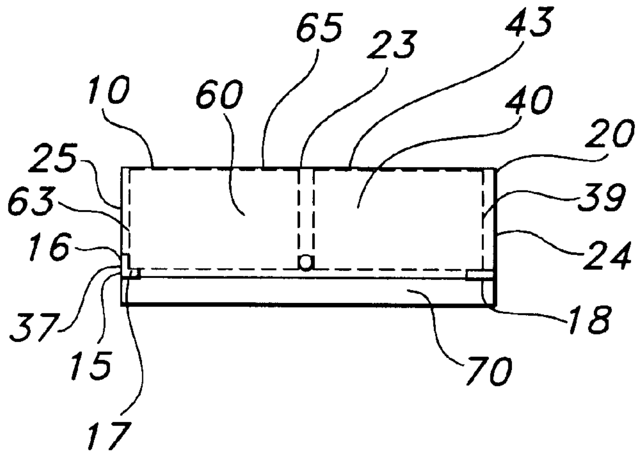

FIGS. 6*a* and 6*b* are top views of the dispenser of FIG. 1A, showing the manner in which the cartridge is moved into operational engagement with the dispenser's housing.

Figure 7:
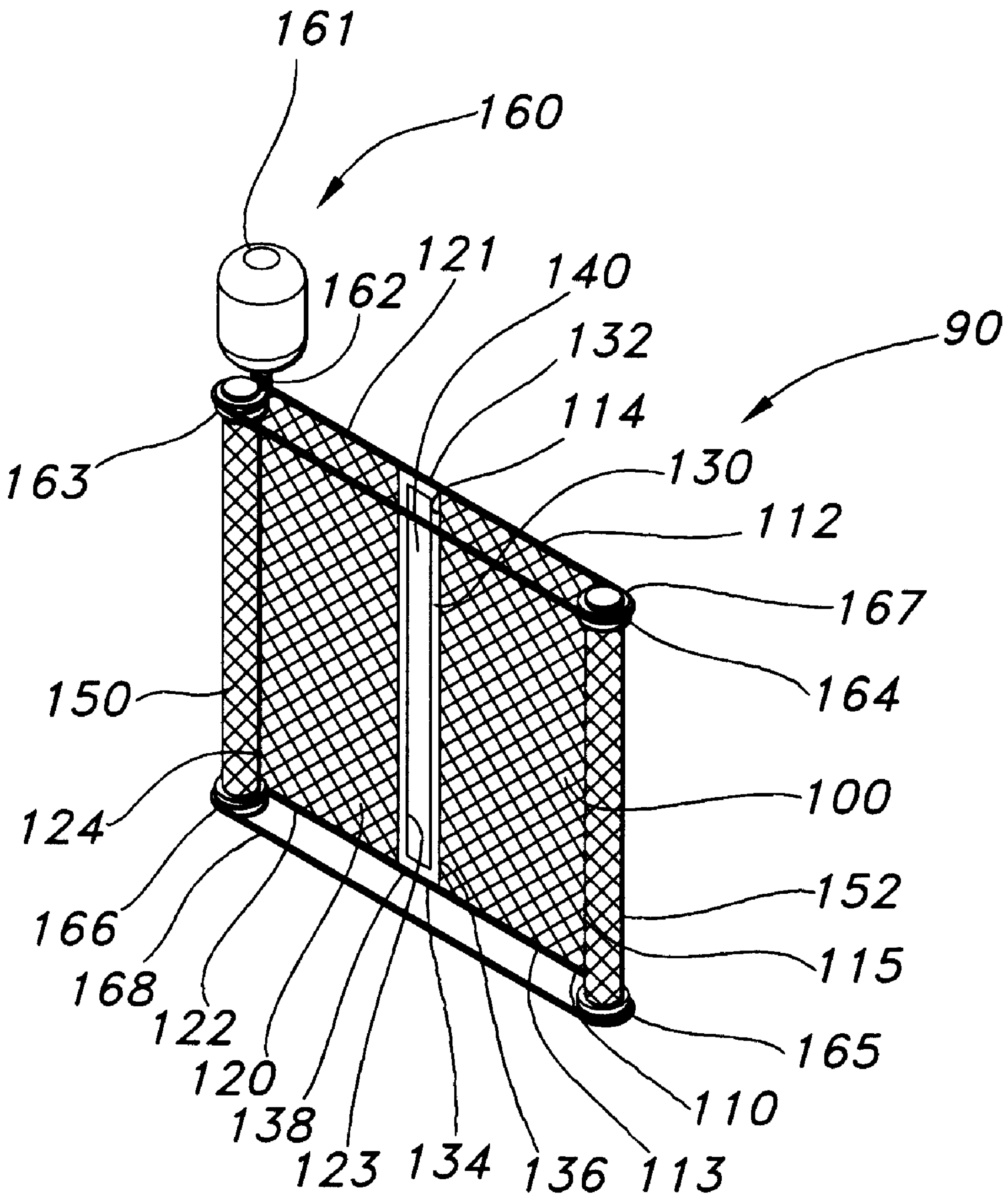

FIG. 7 is a pictorial view of the receptacle door assembly of the dispenser of FIG. 1A.

Figure 8:
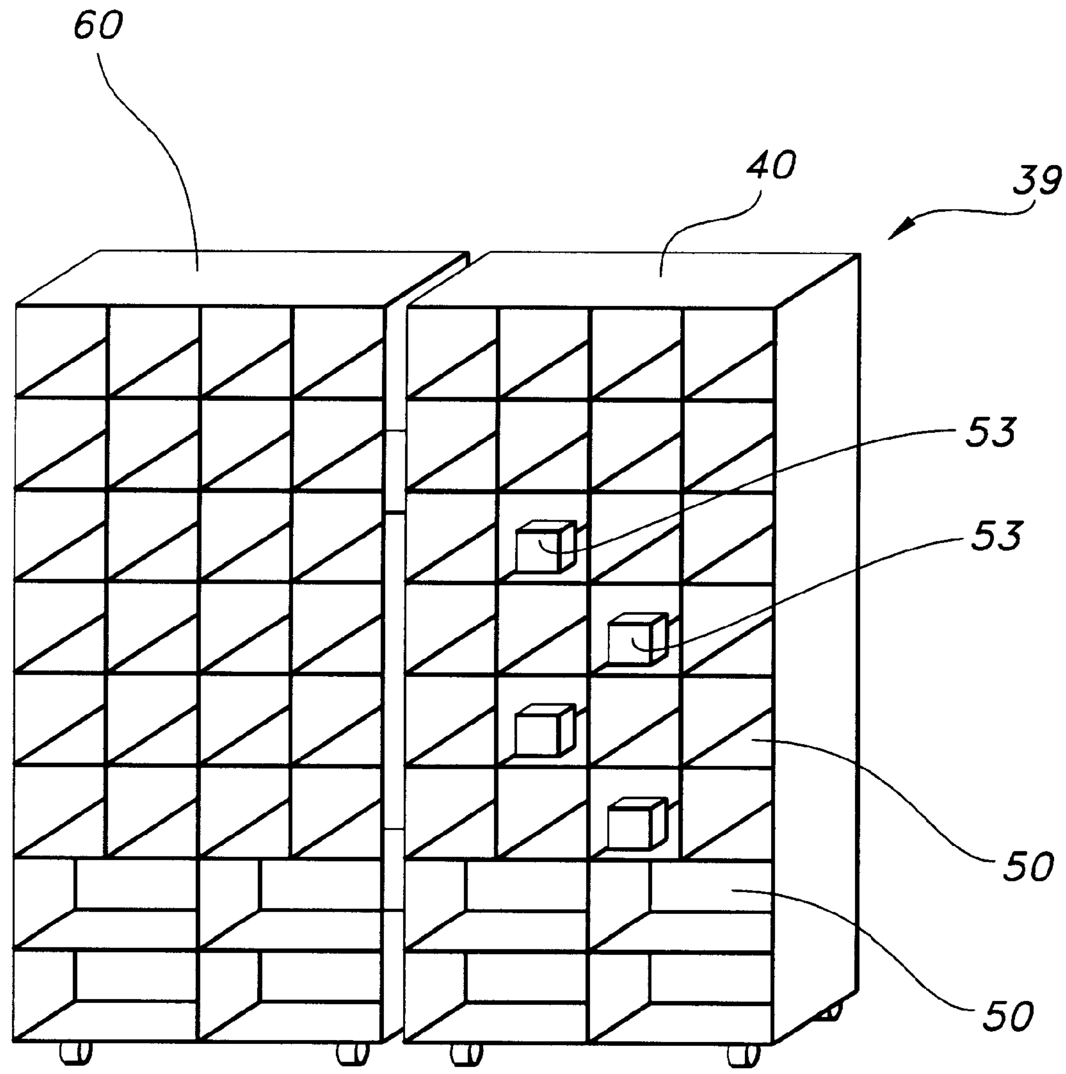

FIG. 8 is a pictorial front view of a dispenser cartridge according to an alternative embodiment of the invention that has receptacles of two different widths.

Figure 9:
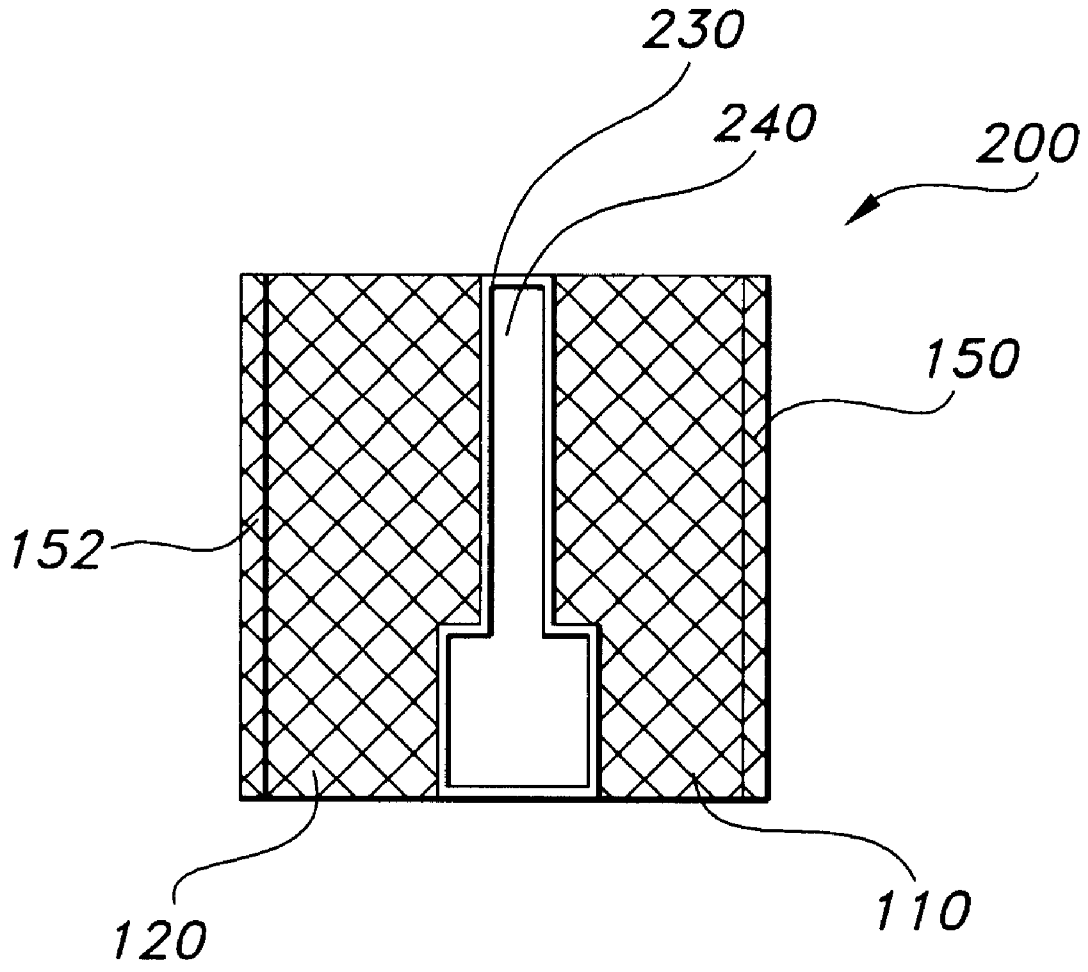

FIG. 9 is a front view of a receptacle door according to an alternative embodiment of the invention that has a vertical opening that varies in width.

Figure 10:
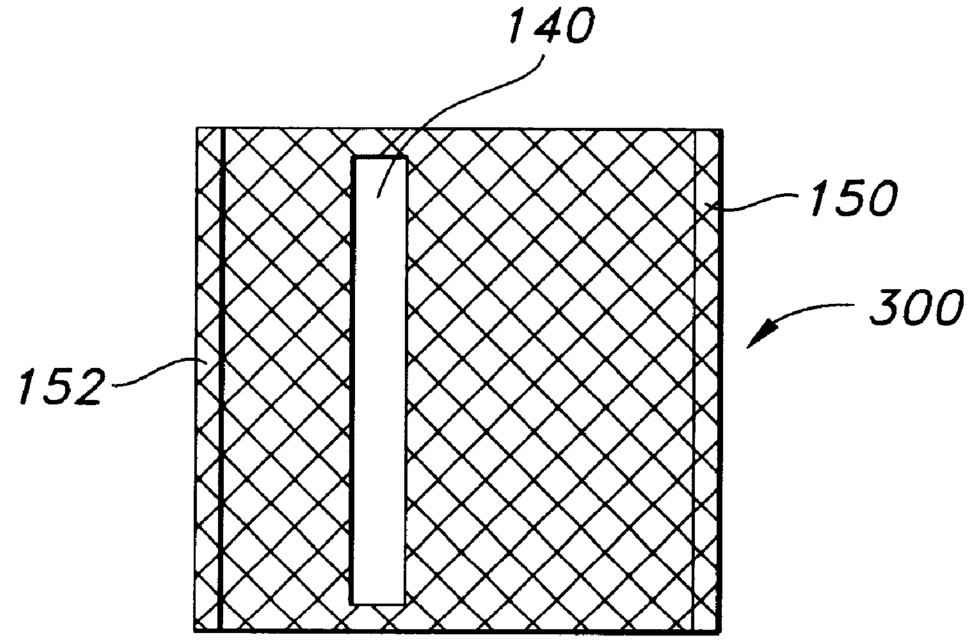

FIG. 10 is a front view of a receptacle door according to an alternative embodiment of the invention, having a vertical opening that is defined within a single sheet of material.

Figure 11:
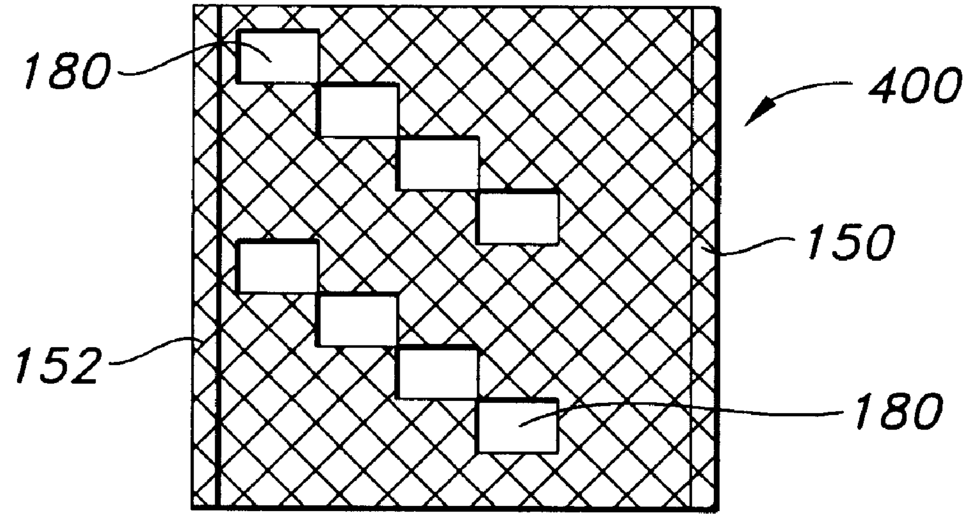

FIG. 11 is a front view of a receptacle door according to an alternative embodiment of the invention, having several individual access holes that are defined within a single sheet of material.

Figure 12:
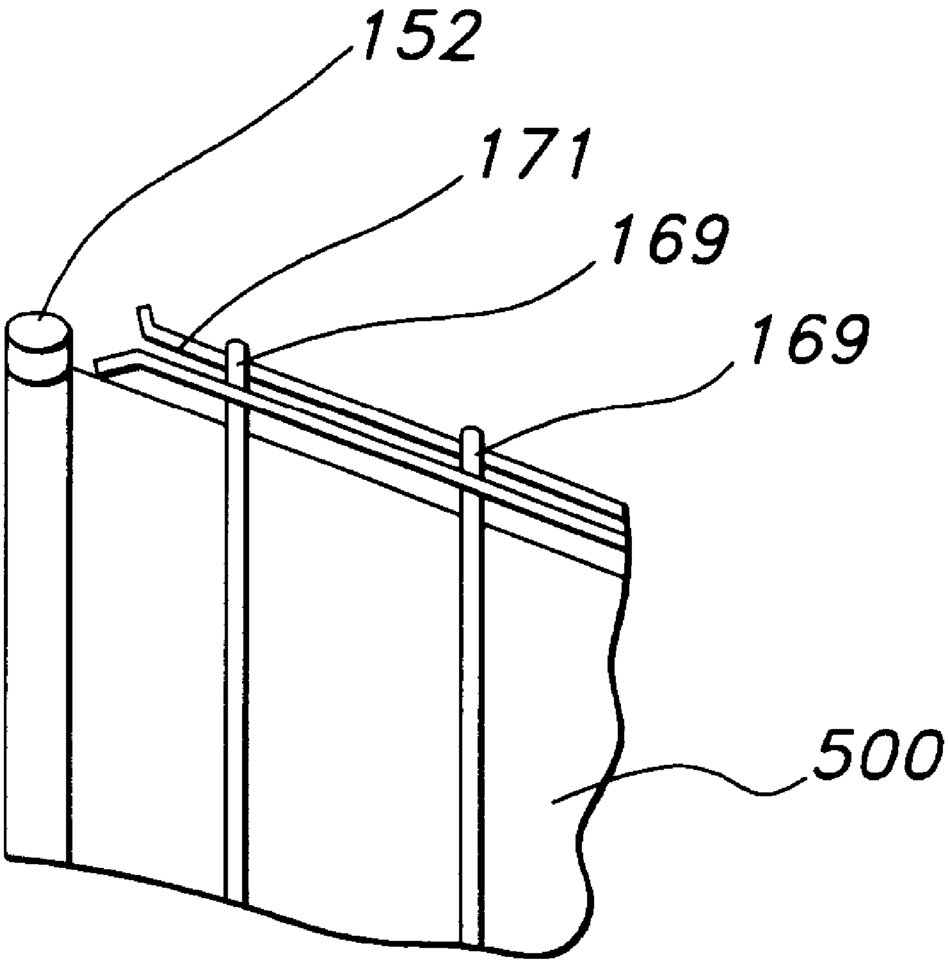

FIG. 12 is a pictorial view of a receptacle door according to an alternative embodiment of the invention, that includes vertical slats for supporting the receptacle door.

Figure 13A:
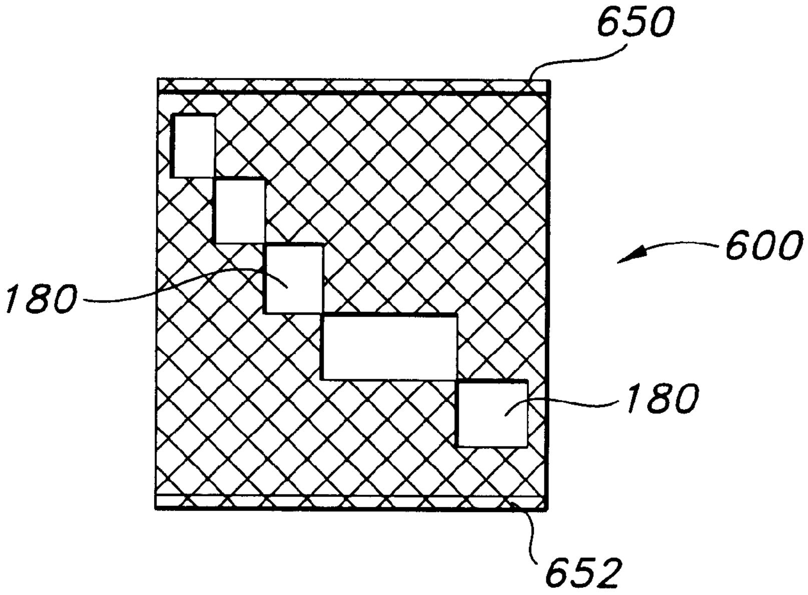
Figure 13B:
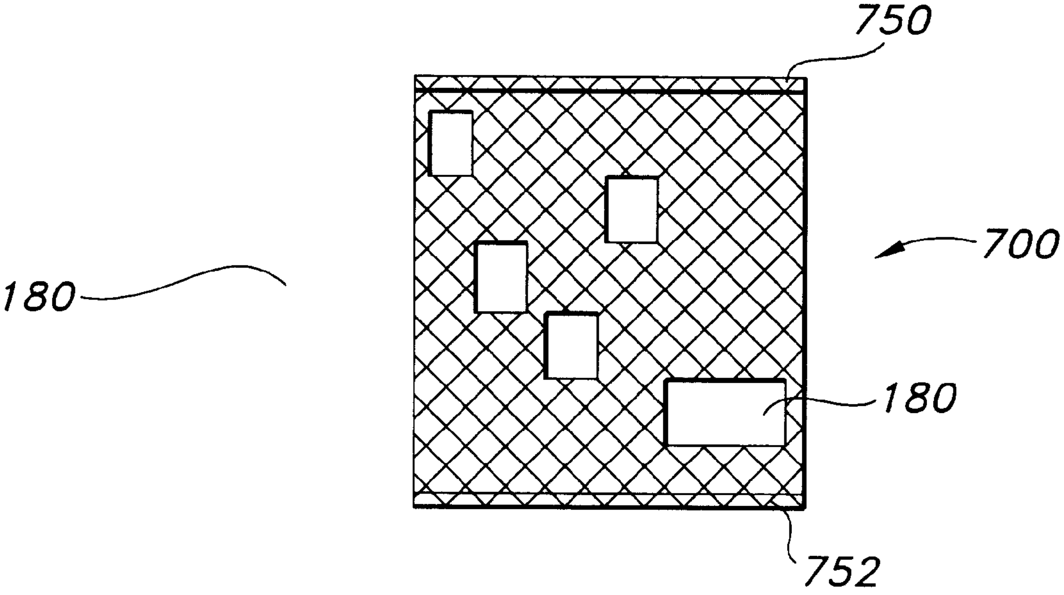

FIGS. 13*a* and 13*b* are front views of a receptacle door according to an alternative embodiment of the invention, that is disposed on horizontal, rather than vertical, rollers.

Figure 14:
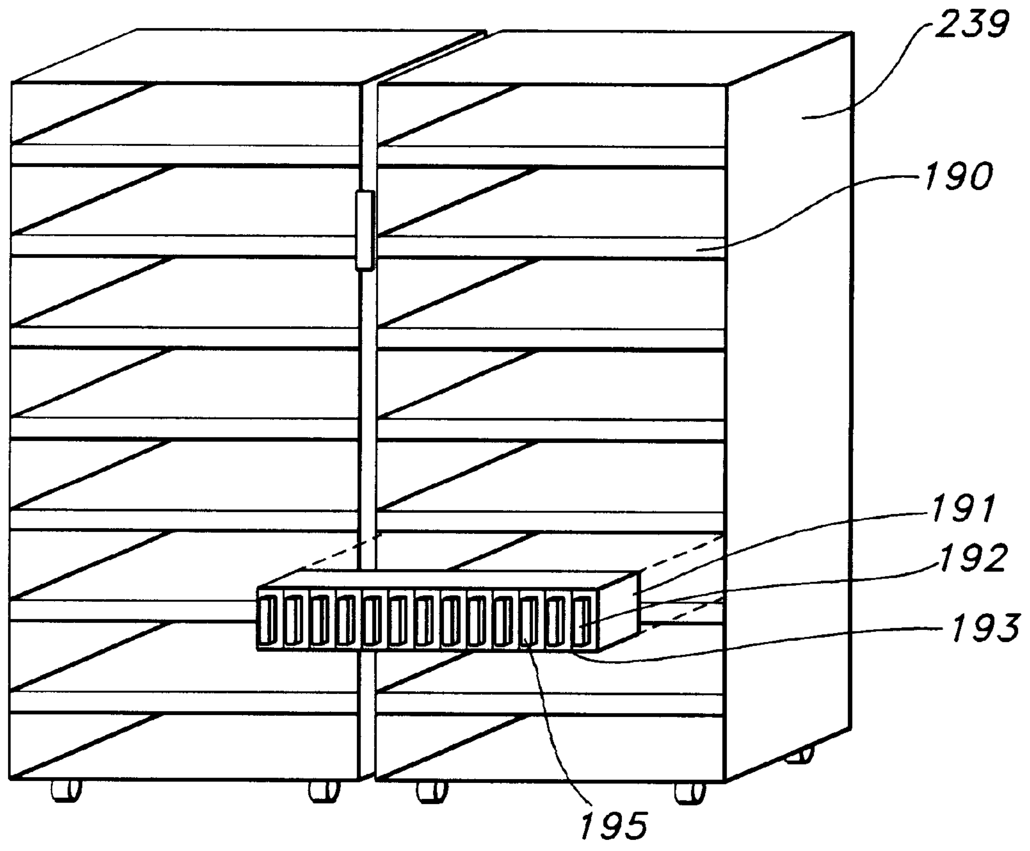

FIG. 14 is an exploded, pictorial front view of a dispenser cartridge according to an alternative embodiment of the invention that includes horizontal shelves for supporting divided packages of articles to be dispensed from the dispenser.

Figure 15:
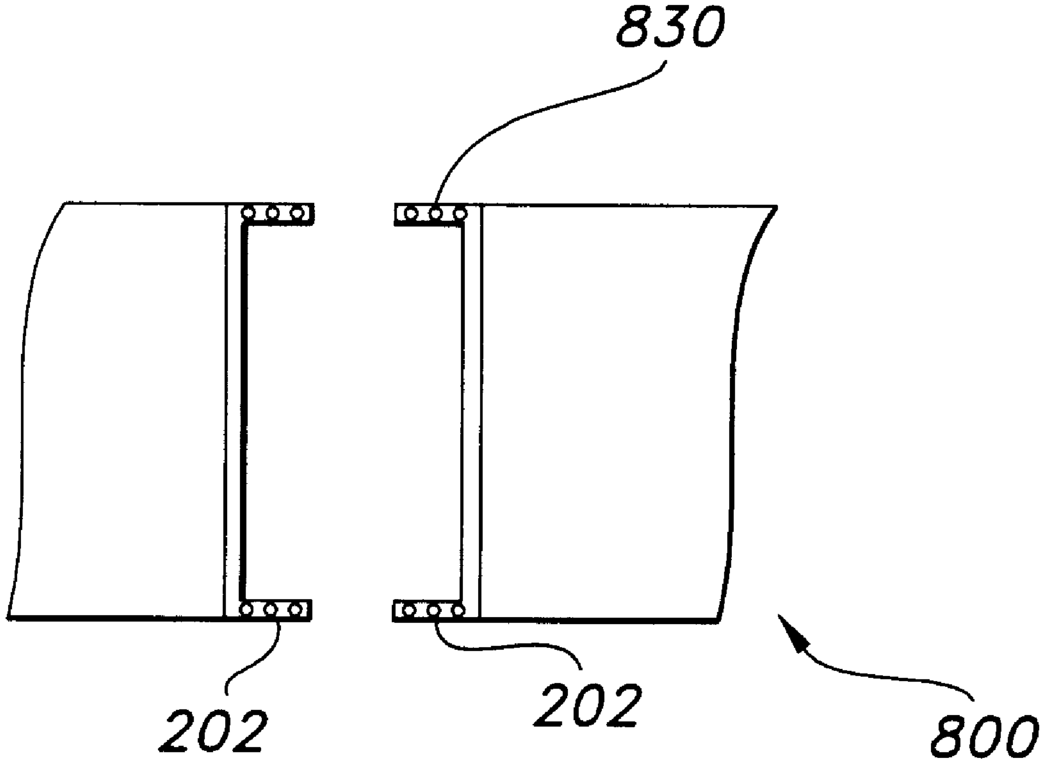

FIG. 15 is a front view of a receptacle door according to an alternative embodiment of the invention having a frame that is adjustable in width.

DETAILED DESCRIPTION OF THE PREFERRED EMBODIMENT

The present invention now will be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation. A preferred embodiment of the invention is first introduced generally below and then described in greater structural detail.

As may be understood from FIGS. 1–3, a dispenser 10 according to a preferred embodiment of the invention includes a housing 20 that defines an interior portion 27; a distribution cartridge 39 having an orthogonal array of receptacles 50 for receiving articles 53 to be distributed from the dispenser 10; and a hinged main door 70 for controlling access to the cartridge 39 and to the interior of the various receptacles 50. The main door 70 defines a rectangular opening 38 having a plurality of horizontal portions 11, each of which aligns with a row of receptacles 50 within the distribution cartridge 39. Access to these horizontal portions 11 is controlled by a plurality of lockable hinged user doors 84 disposed on the exterior of each of the main doors 70. Thus, when one of the user doors 84 is unlocked and the remaining user doors 84 are locked, a user has potential access only to receptacles 50 within the row of receptacles 50 with which the user door 84 is aligned.

As shown in FIG. 2, a flexible receptacle door 100, which is made of ballistic nylon or the like, is mounted on the interior of the main door 70. The receptacle door 100 defines a vertical opening 140 that may be aligned with any column of receptacles 50 within the distribution cartridge 39 so that access to all receptacles 50 not within the column of receptacles 50 is prevented. The receptacle door 100 extends between and is wound partially onto two parallel vertical rollers 150, 152 disposed on the interior of the main door 70. In this configuration, the vertical opening 140 may be moved laterally relative to the cartridge 39 and the rollers 150, 152 by rotating the rollers 150, 152 so that a posterior portion of the receptacle door 100 winds off of one of the rollers and an anterior portion of the receptacle door 100 winds onto the other roller.

The dispenser 10 further includes a control mechanism 170 for positioning the receptacle door 100 and for locking and unlocking the user doors 84 to individually distribute articles 53 from within the receptacles 50.

In operation, after a user requests a particular type of article 53, the control mechanism 170 identifies from its pre-programmed memory a target receptacle that contains an article 53 meeting the criteria entered by the user. The control mechanism 170 then drives a drive mechanism 160 until the vertical opening 140 in the receptacle door 100 is aligned with a target column of receptacles 50 that includes the target receptacle. After this procedure is complete, the receptacle door 100 prevents access to the interior of all of the receptacles 50 that are not within the target column of receptacles 50.

Next, the control mechanism 170 unlocks the user door 84 that is aligned with the row of receptacles 50 containing the target receptacle. Once the user door 84 is unlocked, the user will potentially have access to all receptacles 50 within the row of receptacles 50 with which the user door 84 is aligned. Access to the other receptacles 50 is prevented by the other user doors 84, which remain locked.

After the user door 84 is unlocked, the user may open the user door 84 to reveal the horizontal region of the receptacle door 100 that is immediately adjacent the exposed horizontal opening 82 in the main door 70. Because the receptacle door 100 is positioned so that its vertical opening 140 is aligned with the target receptacle, the receptacle door 100 prevents access to each receptacle in the target row of receptacles except the target receptacle. Thus, the main door 70, the locked user doors 84, and the receptacle door 100 combine to block access to all receptacles aside from the target receptacle. A user may remove the contents of the target receptacle through the exposed horizontal opening 82 in the main door 70 and through the vertical opening 140 in the receptacle door 100. After the item is removed and the user closes the user door 84, the control mechanism 170 re-locks the user door 84 and moves the receptacle door 100 into a home position in preparation for dispensing an item to a next user.

The structure and operation of the dispenser 10 according to a preferred embodiment of the invention is described in greater detail below.

I. Structure of the Preferred Embodiment

The Housing

As shown in FIG. 2, a dispenser 10 according to a preferred embodiment of the invention includes a housing 20 that is in the form of an open-faced rectangular box. More particularly, the housing 20 includes a planar rectangular horizontal floor 21 (which may optionally be excluded from the preferred embodiment), a planar rectangular horizontal ceiling 22 that is parallel to and offset from the floor 21, a planar vertical rear wall (not shown) that extends between the corresponding rear edges of the floor 21 and the ceiling 22, a first planar rectangular side wall 24 that extends between corresponding first side edges 30, 31 of the floor 21 and the ceiling 22, and a second planar rectangular side wall 25 that is parallel to and offset from the first side wall and that extends between corresponding second side edges of the floor 21 and the ceiling 22. The floor 21, ceiling 22, rear wall, and first and second side walls 24, 25 define a hollow interior storage portion 27 that is of suitable size to store a plurality of objects to be dispensed from the dispenser 10. The housing 20 also includes a front opening 26 that is defined by the front edges of the floor 21, the ceiling 22, and the first and second side walls 24, 25. The housing 20 is preferably made of a sturdy, rigid material, such as steel, in order to prevent the theft of articles from within the interior of the housing 20.

The dispenser may also include a ramp (not shown) that is disposed adjacent the front opening 26 of the housing 20 and that extends downwardly between the front opening 26 and a floor surface immediately in front of the front opening 26. This ramp may be used to support a dispensing cartridge 39 as it is wheeled from the floor surface, through the front opening 26 and into the interior portion 27 of the dispenser 10.

The Cartridge

As shown in FIGS. 2 and 3, the dispenser 10 includes a dispensing cartridge 39 for storing articles to be dispensed from the dispenser 10. This cartridge 39 includes a first rectangular open faced box 40 having a planar rectangular horizontal floor 41, a planar rectangular horizontal ceiling 42 that is parallel to and offset from the floor 41, a planar vertical rear wall (not shown) that extends between corresponding rear edges (not shown) of the floor 41 and the ceiling 42, a first planar rectangular side wall 44 that extends between corresponding first side edges 54, 55 of the floor 41 and the ceiling 42, and a second planar rectangular side wall 45 that is parallel to and offset from the first side wall 44 and that extends between corresponding second side edges 56, 57 of the floor 41 and the ceiling 42. The floor 41, ceiling 42, rear wall (not shown), and first and second side walls define an interior storage portion 47 that is of suitable size to store a plurality of articles 53 to be dispensed from the dispenser 10. A series of parallel horizontal divider members 48 extend from the first side wall 44 to the second side wall 45. As shown in FIGS. 2 and 3, these horizontal divider members 48 are parallel to and offset from one another and provide a surface for supporting the weight of items stored within the cartridge 39. The horizontal divider members 48 also serve to divide the individual rows of articles stored within the cartridge 39.

As may be understood from FIGS. 2 and 3, the cartridge 39 also includes a series of planar vertical divider members 49 that extend between the floor 41 and the ceiling 42 of the first open faced box 40. Like the horizontal divider members 48, the vertical divider members 49 are parallel to and offset from one another. The vertical divider members 49 serve to divide the individual columns of articles stored within the cartridge 39.

As shown in FIGS. 2 and 3, the horizontal and vertical divider members 48, 49 structurally interlock in a known manner to create a series of equally-sized receptacles 50 having a rectangular (and preferably square) cross-section. These receptacles 50, which are accessible only through the front opening of the open-faced box, are used to store articles 53 before they are dispensed from the dispenser 10.

As may also be understood from FIGS. 2 and 3, the cartridge 39 also includes a second open-faced box 60 that is essentially structurally identical to the first open-faced box 40. The first side 62 of this second open-faced box 60 is attached to the second side (not shown) of the first open-faced box 40 via a hinge 61 so that the first and second open-faced boxes 40, 60 may moved into a "closed" position in which the front edges of the ceilings, floors, and side walls of the first and second boxes 40, 60 abut one another. As may be understood from FIG. 4, in this position, the first and second boxes 40, 60 combine to form a combined closed box 66 that does not allow for access to the interior of the first and second boxes 40, 60. The cartridge 39 includes a lock 68 for locking the first and second open-faced boxes 40, 60 into this closed position.

As shown in FIGS. 2, 3, and 5, the first and second open-faced boxes 40, 60 are also configured to be rotated about the hinge 61 into an "open" position in which the open faces of the boxes 40, 60 are immediately adjacent to one another and lie in the same plane. In this open position, access is provided to each compartment within the cartridge 39 through the open faces of the first and second boxes 40, 60.

The cartridge 39 may optionally include a plurality of wheels 69 or other conventional roller mechanism disposed on the exterior surface of the floors of the first and second open-faced boxes 40, 60. The wheels 69 support the boxes and allow the boxes to be wheeled relative to each other and into and out of operative engagement with the interior portion 27 of the housing 20. These wheels 69 may be configured and attached to the boxes 40, 60 in any of many ways and configurations known in the art.

In a preferred embodiment of the invention, shown in FIGS. 6*a* and 6*b*, the housing 20 includes an angled stop 15, which is preferably made of flexible material such as rubber. The stop 15 preferably includes a planar rectangular side portion 16, that extends along the front vertical edge 37 of the second side wall 25 of the housing 20, and a planar rectangular front portion 17 that is substantially perpendicular to the side portion 16 of the stop 18 and that lies in substantially the same plane as the open front portion 26 of the housing 20 as shown in FIG. 6*a*. As described in more detail below, this front portion 17 of the stop 18 serves to restrict the movement of the cartridge 39 through the open front portion 26 of the housing 20. This embodiment also includes a manually operated latch 18 that is attached, via a hinge (not shown), to the front edge 36 of the first side wall 24 of the housing 20, and that is movable between a first "unlocked" position (see FIG. 6*a*), in which the latch 18 does not obstruct the open front portion 26 of the housing 20, to a second "locked" position (see FIG. 6*b*), in which the latch 18 partially obstructs the open front portion 26 of the housing 20.

The cartridge 39 is dimensioned so that it may be placed into the interior of the housing 20 and secured (i.e. registered) in place. This may be accomplished by first opening the main door 70 and wheeling a portion of the cartridge 39 into the interior of the housing 20 so that the front edge of the second side wall 63 of the cartridge's second box 60 comes in contact with the side portion 16 of the stop 15 as shown in FIG. 6*a*. The cartridge 39 is then aligned within the housing 20 so that the rear walls 43, 65 of the cartridge 39 are spaced slightly apart from and substantially parallel to the rear wall 23 of the housing 20. The latch 18 is then moved from the first "unlocked" position to the second "locked" position so that cartridge 39 is held within the housing 20 by the latch 18 and the front portion 17 of the stop 15. As discussed in more detail below, this allows a main door 70 positioned in front of the open front portion 26 of the housing 20 to control access to the interior of the receptacles 50. The latch 18 and stop 15 may be replaced by any other fastening means known in the art that restrains the cartridge 39 in a proper orientation within the housing 20.

The Main Door

As shown in FIG. 2, the dispenser 10 includes a planar rectangular main door 70 having a top edge 71, a bottom edge 72, a first side edge 73, and a second side edge 74. The main door 70 is attached to the second side wall 25 of the housing 20 via a hinge 81 as shown in FIG. 2 so that the main door 70 may be moved into a first position (See FIG. 1) in which the main door 70 entirely covers the front opening 26 of the housing 20. To facilitate re-loading of the dispenser 10, the main door 70 may also be moved into a second position (See FIG. 2) in which the main door 70 is positioned adjacent the second side wall 25 of the housing 20, but does not obstruct access to the interior portion 27 of the housing 20. The dispenser 10 also includes a lock (not shown) for locking the main door 70 into the second position.

As may be understood from FIGS. 1A and 3, in a preferred embodiment of the invention, the main door 70 defines a rectangular opening 38 that is approximately the same size and shape as the perimeter of the front surface of the open cartridge 39. (See FIG. 3.) Thus, the width this opening 38 is approximately the same as the width of a row of receptacles 50 that extends from the first side wall 44 of the cartridge's first box 40 to the second side wall 63 of the cartridge's second box 60 when the cartridge 39 is in the "open" position. Similarly, the height of the opening 82 is approximately the same as the height of the various columns of receptacles 50 within the cartridge 39. This opening 38 is positioned so that, when cartridge 39 is registered in place within the housing 20 and the main door 70 is closed, each of the receptacles 50 within the cartridge 39 may be accessed through the opening 38.

As shown in FIG. 1A, the dispenser 10 also includes a vertical array of planar rectangular user doors 84 that are attached to the front side of the main door 70 via hinges (not shown), and that are each dimensioned and positioned to cover a horizontal portion 11 of the rectangular opening 38 in the main door 70. The width of each of these horizontal portions 11 is approximately the same as the width of the rectangular opening 38, and the height of each of these horizontal portions 11 is approximately the same as the height of the various receptacles 50 within the cartridge 39. Each rectangular user door 84 is configured to pivot about a horizontal hinge (not shown) from a first position, in which the user door 84 completely covers one of the horizontal portions 11, to a second position, in which the user door 84 is positioned adjacent the horizontal portion 11 but does not obstruct access to the horizontal portion 11. As discussed in detail in our U.S. Pat. No. 5,638,985, the user doors 84 are normally locked in the first position, but may be unlocked, one at a time, to allow access to the horizontal opening 82.

In an alternative embodiment of the invention (shown in FIG. 1B), the main door 70 includes a plurality of individual, rectangular horizontal openings 82, rather than a single, large rectangular opening 38 for providing access, through the main door 70, to the cartridge 39. As shown in FIG. 1B, these openings 82 are preferably arranged in a single column. The structure and functionality of this embodiment of the invention is essentially the same the preferred embodiment described above. However, rather than being dimensioned and positioned to control access to a horizontal portion 11 of a large rectangular opening 38 in the main door 70, each user door 84 is dimensioned and positioned to control access to one of the individual horizontal openings 82 in the main door 70.

The Receptacle Door Assembly

As shown in FIGS. 2 and 7, the dispenser 10 also includes an receptacle door assembly 90 that is disposed on the interior of the main door 70. As described in detail below, this receptacle door assembly 90 serves to control access to the individual columns of receptacles 50 within the cartridge 39.

Generally speaking, the receptacle door assembly 90 comprises a first roller 150 mounted adjacent and parallel to the first side edge 74 of the main door 70; a second roller 152 mounted adjacent and parallel to the second side edge 73 of the main door 70 so that the second roller 152 is offset from and parallel to the first roller 150; a rectangular receptacle door 100 that defines a vertical opening 140 and includes flexible material that extends between the first and second rollers 150, 152; and a drive mechanism 160 for moving the receptacle door 100 so that the vertical opening 140 moves laterally relative to the first and second rollers 150, 152.

More specifically, the vertical opening 140 of the receptacle door 100 is surrounded by a rectangular frame 130 having a top edge 132, a bottom edge 134, a first side edge 136 and second side edge 138. As shown in FIG. 7, the various edges of the frame 130 define the receptacle door's vertical opening 140. The flexible material of the receptacle door 100 includes a first rectangular fabric sheet 110 and a second rectangular fabric sheet 120, each extending between the frame and one roller and each having a top edge 112, 121, a bottom edge 113, 122, an inner side edge 114, 123 and an outer side edge 115, 124. The heights of the side edges of the frame 130 and the side edges of the first and second rectangular fabric sheets 110, 120 are preferably approximately the same.

The inner side edges 114, 123 of the first and second fabric sheets 110, 120 are attached to opposite side edges 136, 138 of the frame 130. Similarly, the outer side edges 115, 124 of the first and second fabric sheets 110, 120 are wrapped around and attached to the first and second rollers 150, 152, respectively. In this configuration, the vertical opening 140 may be moved laterally relative to the cartridge 39, the rollers 150, 152, and the horizontal openings 82 in the main door 70 by rotating the rollers 150, 152 so that a portion of the receptacle door 100 near one of the receptacle door's outer side edges 115, 124 winds off of the corresponding roller and a portion of the receptacle door 100 near the other of the receptacle door's outer side edges 115, 124 winds onto the other roller.

The Drive Mechanism

The dispenser 10 further includes a drive mechanism 160 for rotating the first and second rollers 150, 152 about their respective central axes. As shown in FIGS. 2 and 7, the drive mechanism 160 includes four sprockets 163–166: a first sprocket 163 attached to the upper end of the first roller 150; a second sprocket 164 attached to the upper end of the second roller 152; a third sprocket 165 attached to the lower end of the second roller 152; and a fourth sprocket 166 attached to the lower end of the first roller 150. The first sprocket 163 includes a worm gear (not shown) that is positioned so that the worm gear and the first sprocket 163 are coaxial and are attached to a common shaft. This causes the worm gear to rotate in synch with the first sprocket 163.

The drive mechanism 160 further includes a first drive chain 167 that extends around and between the first and second sprockets 163, 164, and a second drive chain 168 that extends around and between the third and fourth sprockets 165, 166. The first and second drive chains 167, 168 are tightened so that the prongs of the various sprockets extend through openings in the first and second drive chains 167,

168. This serves to mechanically couple the first roller 150 to the second roller 152 so that when the first roller 150 is rotated about its central axis, the second roller 152 mirrors the rotation of the first roller 150.

The drive mechanism 160 further includes a motor 161 that is configured to drive a worm 162. The worm 162 is positioned to engage the first sprocket/worm gear 163 so that when the motor 161 rotates the worm 162, the worm 162 in turn rotates the first sprocket 163. This serves to rotate the first and second rollers 150, 152 about their central axes. In this way, the motor 161 is used to move the vertical opening 140 laterally relative to the first and second side edges 73, 74 of the main door 70.

As shown in FIG. 2, in one embodiment of the invention, the motor 161 is mounted to the front edge of the housing's ceiling 22 with its drive shaft coaxial with the pivot axis of the hinges 81. Such a configuration is advantageous because it allows the housing 20, rather than the main door 70, to support the weight of the motor 161 (which may be relatively heavy). As may be understood from FIG. 2, in such a configuration, the motor 161 is positioned so that the worm 162 may remain in engagement with the worm gear/first sprocket 163 as the main door 70 is opened and closed, because the axis of the first roller 150 remains equidistant from the axis of the worm 162.

As described in the discussion of the receptacle door 100 above, the worm gear/first sprocket 163 is mechanically connected both to the second roller 152 and the first roller 150 so that the first and second rollers 150, 152 rotate in synch with the first sprocket 163. Because of this, and because the threads of the worm 162 hold several of the teeth of the worm gear/first sprocket 163 in place when the worm 162 is not moving, the worm 162 locks the rollers 150, 152 (and, thus, the receptacle door 100) in place when the worm 162 is not in motion. This serves to prevent users from manually moving the receptacle door 100 to gain access to receptacles 50 other than a pre-determined target receptacle.

In a preferred embodiment of the invention, the drive mechanism 160 includes a clutch (not shown), that is installed within the drive mechanism 160, as is well known in the art, to link the motor 161 to the worm 162. This clutch may be used to disengage the worm 162 from the motor 161 when the main door 70 is being opened and closed. When the worm 162 is disengaged from the motor 161, the worm 162 is free to rotate. Thus, when the main door 70 is opened as shown in FIG. 2, the worm 162 rotates due to the movement of the first sprocket 163. Because the worm 162, rather than the first sprocket 163, rotates as when the main door 70 is opened, the receptacle door 100 does not move laterally when a user opens the main door 70.

In another preferred embodiment of the invention, both the motor 161 and the worm 162 are mounted on the main door 70. This allows a user to open the main door 70 without either moving the receptacle door 100 laterally, or disengaging the worm 162 from the motor 161 as discussed above.

The Control Mechanism

As noted above, the dispenser 10 includes a computerized control mechanism 170 for controlling access to the to the various receptacles 50 within the cartridge 39. This control mechanism 170 includes a programmable memory which may be programmed to store the contents of each of the receptacles 50. The control mechanism 170 further includes a user interface for processing requests for particular items, and a mechanism for locking and unlocking the dispenser's user doors. Additionally, the control mechanism 170 includes a mechanism for activating the motor 161 and causing the motor 161 to rotate the first and second rollers 150, 152 in the first and second directions as discussed above. Furthermore, the control mechanism 170 includes a computer processor that is operative to: (1) identify a target receptacle that contains an article that meets the criteria of a particular user's request; (2) drive the motor so that the vertical opening 140 within the receptacle door 100 is aligned with a target column of receptacles 50 containing the target receptacle; (3) unlock the user door 84 that is aligned with the row of receptacles 50 containing the target receptacle; (4) relock the user door 84 after the article is removed and the user door 84 is closed; and (5) drive the motor 161 so that the vertical opening 140 within the receptacle door 100 is moved into a home position. This home position is equidistant between the first side wall 44 of the cartridge's first box 40 and the second side wall 63 of the cartridge's second box 60. A somewhat similar control mechanism 170 is described generally in U.S. Pat. No. 5,638,985, which is incorporated herein by reference.

As noted above, the control mechanism is operable to drive the motor so that the vertical opening 140 within the receptacle door 100 is aligned with a target column of receptacles 50 containing the target receptacle. In one embodiment of the invention, the motor 161 is a stepper motor, and the control mechanism 170 aligns vertical opening 140 within the receptacle door 100 with the appropriate column of receptacles 50 by moving the stepper motor a predetermined number of steps. In another embodiment of the invention, the control mechanism 170 aligns the vertical opening 140 by driving the motor 161 until a sensor disposed adjacent the target receptacle 50 indicates that the receptacle door 100 is properly aligned. Such techniques are well known in the art.

"Receptacle Full" Sensor

In a preferred embodiment of the invention, the dispenser includes one or more "receptacle full" sensors 172 for determining whether each of the various receptacles 50 contains an article 53 to dispensed. These sensors 172 are preferably linked to the control mechanism 170, in a manner known in the art, to allow the sensors 172 to transfer this "receptacle full" information to the control mechanism 170. As discussed in more detail below, after a user requests a particular article 53, the control mechanism 170 may use this information to identify a receptacle 50 that contains the requested article 53.

In a preferred embodiment of the invention, shown in FIG. 2, one or more "receptacle full" sensors 172 are attached to the receptacle door 100 so that each sensor 172 aligns with a particular row of receptacles 50 immediately after the main door 70 is closed. These "receptacle full" sensors 172 are preferably positioned immediately adjacent the vertical opening 140 in the receptacle door 100. In one preferred embodiment, one "receptacle full" sensor 172 is positioned adjacent each row of receptacles. This allows the dispenser 10 to take an inventory of the contents of the entire cartridge 39 by moving the receptacle door 100 laterally along the open front portion 46 of the cartridge 39 so that a "receptacle full" sensor 172 passes in front of each of the various receptacles 50. As a "receptacle full" sensor 172 passes in front of a particular receptacle 50, the sensor 172 transmits a signal to the control mechanism 170 that indicates whether the receptacle 50 is empty or full.

As will be understood to one of skill in the appropriate art, the sensors 172 described above may be replaced by other types and configurations of sensors for determining whether the various receptacles 50 are empty or full. For example, a sensor may be placed within each individual receptacle 50 for monitoring whether the receptacle 50 is empty or full.

II. Operation of the Preferred Embodiment

To use the dispenser 10, an operator at a central cartridge loading facility first moves an empty cartridge 39 into the open position so that all of the receptacles 50 within the cartridge 39 are exposed. During this process, the first and second boxes 40, 60 that comprise the cartridge 39 move relative to one another on separate sets of wheels 69. The operator then loads an article 53 to be dispensed into each of the receptacles 50, moves the cartridge 39 into the closed position, and locks the cartridge 39 closed. Locking the cartridge 39 in the closed position ensures that no articles will be removed from the cartridge 39 between the time that the cartridge 39 is loaded and the time that the cartridge 39 is loaded into the dispenser 10.

After loading and locking the cartridge 39, the operator wheels the cartridge 39 to a remote dispenser 10. The operator then unlocks and opens the dispenser's main door 70, wheels the empty cartridge 39 out of the interior portion 27 of the housing 20 and locks the empty cartridge 39 into the closed position. Next, the operator unlocks and opens the loaded cartridge 39, wheels the cartridge 39 into operable engagement with the interior portion 27 of the housing 20, and secures the cartridge 39 into registration with the housing 20 using a manually operated latch or similar fastening mechanism. (Thus, there is no need for the operator to lift the cartridge into engagement with the housing.) The operator then closes and locks the main door 70, and wheels the empty cartridge 39 to a central loading facility for re-loading.

After the dispenser 10 is loaded, the dispenser preferably takes an inventory of the entire cartridge 39 by moving the receptacle door 100 laterally along the open front portion 46 of the cartridge 39 so that a "receptacle full" sensor 172 passes in front of each of the various receptacles 50. In a preferred embodiment of the invention, the dispenser 10 takes an inventory of the cartridge 39 by moving the receptacle door 100 from a "home" position (in which the receptacle door's vertical opening 140 is positioned an equal distance between the first side wall 44 of the cartridge's first box 40 and the second side wall 63 of the cartridge's second box 60) to a second position adjacent the first side wall 44 of the cartridge's first box 40. While the receptacle door 100 moves from the "home" to the second position, the sensors 172 scan all of the receptacles 50 in a first half of the cartridge 39. Next, the receptacle door 100 moves so that the vertical opening 140 passes back through the "home" position and into a third position adjacent the second side wall 63 of the cartridge's second box 60. While the receptacle door 100 moves from the "home" positioned to the third position, the sensors 172 scan all of the receptacles in a second half of the cartridge 39. Finally, after all of the receptacles 172 have been scanned, the receptacle door 100 moves back to the "home" position.

As the sensor 172 passes in front of each of the receptacles 50, the sensor 172 transmits a signal to the control mechanism 170 that indicates whether the receptacle 50 is empty or full. Thus, after the various "receptacle full" sensors 170 have passed in front of each of the receptacles 50, the control mechanism 170 contains an inventory of which of the various receptacles 50 contain an article to be dispensed. Alternatively, the operator may program the contents of the various receptacles 50 into the control mechanism's memory by using, for example, entry buttons on the front surface of the control mechanism 170.

Once the dispenser 10 is loaded, a user may request a certain article by entering a request on the user interface of the control mechanism 170. The control mechanism 170 then identifies a target receptacle that contains an article that satisfies the user's request and drives the drive mechanism 160 so that the receptacle door's vertical opening 140 is aligned with a column of receptacles 50 containing the target receptacle. Next, the control mechanism 170 unlocks the user door 84 that is aligned with the row of receptacles 50 containing the target receptacle and informs the user via a display on the control mechanism 170 which user door 84 has been unlocked. The user may then open the unlocked user door 84, reach through the exposed horizontal opening 82 and the vertical opening 140 in the receptacle door 100, and remove the desired article 53 from the interior of the target receptacle. It is important to note that, because the user is only provided access to one row of receptacles 50 through the single, unlocked user door 84, and because the receptacle door 100 covers each of the receptacles 50 within the exposed row except for the target receptacle, the user is physically prevented from accessing the interior of any receptacle other than the target receptacle. This prevents users from taking more than one article from the dispenser 10 at a time.

Once the user has removed the article 53 from the dispenser 10 and has shut the user door 84, the control mechanism 170 re-locks the user door 84 and updates the dispenser's memory to reflect that the article that had been stored within the target receptacle has been removed. The control mechanism 170 then activates the drive mechanism 160 to move the receptacle door 100 so that the vertical opening 140 within the receptacle door 100 is moved into a "home" position that is equidistant between the first side wall 44 of the cartridge's first box 40 and the second side wall 63 of the cartridge's second box 60. This is done to set a maximum distance that the receptacle door 100 will need to be moved to provide access to any next identified target receptacle within the cartridge 39. This, in turn, reduces the maximum time that it may take the dispenser 10 to move the receptacle door 100 to provide access to any given target receptacle 50.

It is important to note that the cartridge 39 need not be loaded in any particular order to function properly. For example, the first, third, and fifth receptacles 50 (starting from the second side wall 63 of the second box of the cartridge 39) in a row of receptacles may contain a first size of article, and the second and fourth receptacles in that same row of receptacles may contain a second size of article. Because the control mechanism 170 is configured to freely move the vertical opening 140 in the receptacle door 100 between non-adjacent receptacles 50 within a row of receptacles, the dispenser 10 is capable of distributing articles non-consecutively from a given row, or series of rows. For example, if a first user requests an article of a small size, the control mechanism 170 may position the receptacle door 100 over the first receptacle from the left end of a first row of receptacles 50 and unlock the user door 84 covering the first row of receptacles 50 to provide access to a first, small-sized, article within the first row of receptacles 50. If a second user then also requests an article of the small size, the control mechanism 170 may then move the receptacle door 100 so that the vertical opening 140 is positioned over the third receptacle from the left end of the first row of receptacles 50 and unlock the user door 84 covering the first row of receptacles to provide access to a second, small-sized article within a first row of receptacles 50. Thus, the dispenser 10 is capable of dispensing articles from within the cartridge 39 by non-consecutively indexing the receptacle door 100 relative to the receptacles 50.

Similarly, the dispenser 10 could be used to non-consecutively dispense a series of articles from different rows within the cartridge 39. For example, in the example discussed immediately above, the second, small-sized article could have been located within the third, rather than the first, row of receptacles. In such a case, the dispenser 10 would dispense the first, small-sized article from the first receptacle in the first row of receptacles 50, and then, before dispensing any additional articles, dispense the second, small-sized article from the third receptacle in the third row of receptacles 50.

It should be understood that the dispenser 10 is operable to move the receptacle door 100 in opposite horizontal directions relative to the cartridge 39. This allows the dispenser to, for example, complete the following steps in sequence: (1) move the receptacle door 100 into a first position in which the receptacle door 100 is positioned to allow a user to remove an article 53 from an interior portion of a first receptacle through the vertical opening 140 in the receptacle door 100; (2) move the receptacle door 100 in a first horizontal direction relative to the first receptacle until the receptacle door 100 is in a second position in which the receptacle door 100 is positioned to allow a user to remove an article 53 from an interior portion of a second receptacle through the vertical opening 140 in the receptacle door 100; (3) moving the receptacle door 100 in a second direction, opposite to the first direction, until the receptacle door is in a third position in which the receptacle door 100 is positioned to allow a user to remove an article 53 from an interior portion of a third receptacle through the vertical opening 140 in the receptacle door 100.

As noted above, after the cartridge 39 is loaded into the housing 20, the dispenser 10 preferably uses one or more "receptacle full" sensors 172 to determine whether each of the receptacles 50 contains an article 53 to be dispensed and sends a corresponding signal to the control mechanism 170. As will be understood by one skilled in the art, the control mechanism 170 may store information from these signals in memory to compile an inventory of the contents of the dispenser 10. The control mechanism 170 may, thus, update the inventory as each article 53 is dispensed from the dispenser 10. In a preferred embodiment of the invention, information regarding the dispenser's inventory may be displayed to a user or service technician over a display screen on the front of the dispenser 10.

In an alternative embodiment of the invention, the dispenser 10 is linked via a phone line or other means known in the art to a central computer that tracks the inventory of the dispenser 10. This allows operators to simultaneously monitor the contents of several dispensers 10, and to provide for quick refilling of each dispenser 10 as needed. In a preferred embodiment of the invention, either the dispenser or the computer system includes a "time to refill" alarm for indicating to an operator that it is time to refill the dispenser 10.

In a preferred embodiment of the invention, the control mechanism 170 is programmed to indicate what size of article 53 is to be stored within each receptacle 50. Thus, for example, the control mechanism 170 might be programmed to indicate that the receptacle 50 in the top row and the rightmost column of receptacles 50 will contain a "Medium" sized set of scrubs. Thus, if the "receptacle full" sensor 172 detects that that this receptacle 50 contains an article 53, it will also know that the receptacle 50 contains a "Medium" sized set of scrubs. This allows the dispenser 10 to keep a detailed inventory of the various sizes and types of articles 53 within the dispenser 10. In a further preferred embodiment of the invention, the dispenser 10 or a central computer to which the dispenser 10 is connected contains a "time to refill" alarm as described above that is activated when the dispenser 10 runs out (or just before the dispenser runs out) of a particular size of articles. For example, this "time to refill" alarm might be activated after the dispenser dispenses its last set of size "Small" surgical scrubs.

Alternative Embodiments of the Invention

As shown in FIG. 8, in an alternative embodiment of the invention, the various receptacles 50 within some rows of receptacles 50 are wider than the receptacles 50 in other rows of receptacles. For example, 6 of 8 of the rows of receptacles may contain receptacles that are 5 inches wide and two of the rows of receptacles 50 may contain receptacles 50 that are 10 inches wide. Such a configuration allows the dispenser 10 to dispense items of differing sizes.

In such an embodiment of the invention, the frame 230 of the receptacle door assembly 90 is not rectangular, but rather contains portions with varying widths as shown in FIG. 9. For example, in the example above, the portions of the frame 230 that correspond to the six rows of 5-inch wide receptacles 50 would be 5 inches wide and the portions of the frame 230 that correspond to the two rows of 10-inch wide receptacles 50 would be 10 inches wide.

In another embodiment of the invention, rather than having a frame 130 or 230 for defining a vertical access opening, a receptacle door 300 comprises a single sheet of flexible material having a vertical access opening within the sheet of material as shown in FIG. 10. This embodiment of the invention fimctions in essentially the same way as the preferred embodiment described above.

In another embodiment of the invention, which is shown in FIG. 11, the receptacle door 400 comprises a single sheet of flexible material defining one or more individual access holes 180 for each row of receptacles 50 within the cartridge 39. To dispense an item from the dispenser 10, an individual access hole 180 is positioned over the target receptacle and the user door 70 covering the row of receptacles 50 in which the target receptacle is located is unlocked to provide access to the interior of the target receptacle through the access hole 180.

In another embodiment of the invention, which is shown in FIG. 12, a flexible receptacle door 500 is provided with a plurality of vertical plastic support slats 169 that are sewn or riveted into the receptacle door 500 and that are spaced apart along the length of the receptacle door 500. These support slats 169 extend between guide rails 171 that are positioned adjacent the upper and lower edges of the main door 70. Alternatively, these guide rails 171 may be replaced by corresponding slots, or tracks, in the top and bottom portions of the main door 70. The ends of the slats 169 are free to side between the guide rails 171 as shown in FIG. 12 when the portion of the receptacle door 500 to which the slats 169 are attached is between the first and second rollers 150, 152. The slats 169 serve to keep the receptacle door 500 from drooping under its own weight or from being pushed down or up by someone trying to gain access to receptacles 50 that are normally covered by the receptacle door 500. In a preferred embodiment of the invention, each slat 169 is dimensioned so that it may be rolled onto first and second rollers 150, 152 along with the portions of the receptacle door 500 to which the slat 169 is attached.

In a further embodiment of the invention, a receptacle door 600, 700 comprises a single sheet of flexible material having individual access holes 180 as described above. These individual access holes 180 may be positioned in a substantially diagonal pattern as shown in FIG. 13*a* or in a random pattern as shown in FIG. 13*b*. In a preferred random pattern, no single column or row of access holes 180 contains more than one access hole 180.

In this embodiment of the invention, the first and second rollers 650, 652 (or 750, 752) are positioned horizontally on the interior of the main door 70, as shown in FIG. 13*a* and 13*b*, so that the first roller 650 (or 750) is positioned adjacent the top edge 71 of the main door 70 and so that the second roller 652 (or 752) is positioned adjacent the bottom edge 72 of the main door 70. As in the embodiment of the invention in which the rollers are vertically oriented, the receptacle door 600 (or 700) extends around and between the rollers 650, 652 (750, 752) and a portion of the receptacle door 600 (or 700) may be moved relative to the rollers 650, 652 (or 750, 752) by rotating the rollers 650, 652 (or 750, 752). To dispense an item from the dispenser 10, an individual access hole 180 is positioned over the target receptacle and the user door 84 covering the row of receptacles in which the target receptacle is located is unlocked to provide access to the interior of the target receptacle through the individual access hole 180.

In yet another embodiment of the invention, a cartridge 239 includes a series of horizontal shelves 190, as shown in FIG. 14, that are configured to receive packages of articles 191 to be dispensed from the dispenser 10. These packages 191 are divided by internal dividers 193 into individual receptacles 195, which are loaded with articles 192 prior to shipping. This allows the operator to load a whole row of the cartridge by simply removing the top of a preloaded package 191 to expose the individual articles 192 stored within their individual receptacles 195, and then placing the open package 191 on the appropriate horizontal shelf 190. This significantly reduces the time required to load the cartridge 239.

In a further embodiment of the invention, shown in FIG. 15, a receptacle door 800 includes a frame 830 that may be adjusted in width to accommodate cartridges 39 having different receptacle widths. In one embodiment of the invention, the frame 830 is comprised of two orthogonal, c-shaped halves 202 which may be positioned to overlap at their ends to form a substantially rectangular planar frame 830. A user may move the c-shaped halves 202 laterally relative to one another to increase or decrease the size of the opening defined by the frame 830. The c-shaped halves 202 may then be secured in place using screws or other fasteners as is well-known in the art.

Conclusion

Accordingly, the present invention serves to provide a compact dispensing apparatus and method that contains relatively few moving parts, and that is inexpensive to manufacture and repair. Furthermore, the present invention provides a vending apparatus having an interior cartridge that may be remotely loaded and wheeled into operative engagement with the dispenser.

While this invention has been described in specific detail with reference to the disclosed embodiments, it will be understood that many variations and modifications may be made within the spirit and scope of the invention as described in the appended claims.

What is claimed is:

1. An apparatus for dispensing and receiving articles, said apparatus comprising:

an array of receptacles for receiving goods to be vended;

a receptacle door disposed adjacent said array of receptacles, said receptacle door comprising at least one sheet of flexible material, said receptacle door being mounted for movement relative to said array of receptacles and defining a region that selectively allows access to an interior of one or more of said receptacles while simultaneously blocking access to an interior portion of the other receptacles in said array;

a drive apparatus for moving said receptacle door relative to said array of receptacles so that said receptacle door permits access to an interior of a selected target receptacle;

a main door mounted to normally prevent access to said region of said receptacle door; and a control mechanism that is operable automatically to enable access to said region of said receptacle door after said receptacle door has been moved to permit access to said interior of said target receptacle.

2. The apparatus of claim 1, wherein said receptacle door is mounted on said main door.

3. The apparatus of claim 1, wherein said flexible material is wound partially on a roller for moving said receptacle door relative to said array of receptacles.

4. The apparatus of claim 3, wherein:

said roller is a first roller;

said apparatus further comprises a second roller; and said receptacle door extends between said first roller and said second roller so that a portion of said receptacle door may be moved relative to said first and second rollers by rotating at least one of said rollers.

5. The apparatus of claim 4, further comprising a clutch for moving said drive apparatus into and out of driving engagement with said at least one of said rollers.

6. The apparatus of claim 4, wherein said receptacle door has a first end and a second end opposite said first end and wherein said first end is configured to rotate about said first roller, and said second end is configured to rotate about said second roller.

7. The apparatus of claim 6, wherein said drive apparatus is configured to drive at least one of said rollers and thereby move said portion of said receptacle door relative to said first and second rollers.

8. The apparatus of claim 7, wherein said drive apparatus is configured to move said portion of said receptacle door in opposite horizontal directions relative to said first and second rollers.

9. The apparatus of claim 7, wherein said drive apparatus is mounted so that said drive apparatus is in driving engagement with a gear disposed on one of said rollers.

10. The apparatus of claim 9, further comprising a housing having an interior portion, said array of receptacles being disposed at least partially within said interior portion of said housing, and wherein said main door is mounted to be moved from a first position, in which said main door permits access to said interior portion of said housing, to a second position, in which said main door obstructs access to said interior portion of said housing, and wherein said drive apparatus is mounted on said housing and positioned so that said drive apparatus remains in driving engagement with said gear when said main door is moved from said first to said second position.

11. The apparatus of claim 10, wherein said gear is a worm gear.

12. The apparatus of claim 1, further comprising at least one sensor for determining whether at least one of said receptacles contains an article.

13. The apparatus of claim 1, further comprising at least one sensor that is positioned adjacent a particular row of said receptacles, said at least one sensor being operative for determining whether each receptacle in said row of receptacles contains an article.

14. The apparatus of claim 13, wherein said sensor is disposed on said receptacle door.

15. The apparatus of claim 13 wherein:

said apparatus comprises a plurality of sensors, at least one of said sensors being positioned adjacent a particular row of said receptacles, said apparatus is operative to move said sensor along said particular row of said receptacles; and said sensor is operative to determine whether each receptacle in said particular row of receptacles contains an article.

16. The apparatus of claim 1, wherein said receptacle door permits access to said interior of said particular one of said receptacles through an opening defined by said receptacle door.

17. The apparatus of claim 16, wherein said drive apparatus is configured to move said receptacle door from a first position in which said opening is substantially aligned with an opening in a first of said receptacles to a second position in which said opening is substantially aligned with an opening in a second of said receptacles, said second receptacle being spaced apart from said first receptacle.

18. The apparatus of claim 17, wherein said array of receptacles forms a substantially horizontal row.

19. The apparatus of claim 18, wherein said drive apparatus is configured to move said receptacle door in a direction generally along the row.

20. The apparatus of claim 19, wherein said opening is substantially vertically elongated.

21. The apparatus of claim 20, wherein a width of a portion of said opening corresponds to a width of at least one of said receptacles.

22. The apparatus of claim 17, wherein said drive apparatus is configured to move said receptacle door relative to said receptacles generally along a vertical column of said receptacles.

23. The apparatus of claim 17, wherein a width of a portion of said opening corresponds to a width of at least one of said receptacles.

24. The apparatus of claim 23, wherein said portion of said opening is a first portion and further comprising a second portion having a width that is different from said width of said first portion, said width of said second portion corresponding to a width of at least one of said receptacles.

25. The apparatus of claim 23, wherein said receptacle door defines a plurality of openings for providing access to at least one of said receptacles.

26. The apparatus of claim 17, further comprising a housing having an interior portion, said array of receptacles being disposed at least partially within said interior portion of said housing, and wherein said array of receptacles is disposed within a cartridge that is configured to be moved into and out of operative engagement with said housing.

27. The apparatus of claim 26, wherein said cartridge is mounted to at least one wheel so that said cartridge may be rolled into and out of operative engagement with said housing.

28. The apparatus of claim 17, wherein said main door comprises at least one user door for enabling access to said region of said receptacle door through said main door.

29. The apparatus of claim 28, wherein said at least one user door is disposed so that at least one of said at least one user doors is operable to cover a substantially horizontal portion of an opening in said main door.

30. The apparatus of claim 29, wherein said at least one user door is disposed so that at least one of said at least one user doors is operable to cover a substantially horizontal opening in said main door.

31. The apparatus of claim 29, wherein said array of receptacles includes a series of horizontal rows of receptacles and a series of vertical columns of receptacles, and wherein at least one of said user doors is operable to control access to at least one of said rows and said receptacle door is operative to control access to at least one of said columns.

32. The apparatus of claim 17, wherein said receptacle door further comprises at least one receptacle door support device for maintaining a portion of said receptacle door in a planar configuration.

33. The apparatus of claim 32, wherein said receptacle door support device is a vertical slat.

34. The apparatus of claim 33, wherein said receptacle door support device is configured to slide within a track disposed adjacent said main door.

35. An apparatus for dispensing and receiving articles, said apparatus comprising:

a housing defining an interior portion;

an array of receptacles for receiving goods to be vended, said receptacles being at least partially disposed within said interior portion of said housing;

a receptacle door disposed adjacent said array of receptacles, said receptacle door comprising at least one sheet of flexible material, said receptacle door being mounted for movement relative to said array of receptacles and defining a region that selectively allows access to an interior of one or more of said receptacles while simultaneously blocking access to an interior portion of the other receptacles in said array;

a drive apparatus for moving said receptacle door relative to said array of receptacles so that said receptacle door permits access to an interior of a selected target receptacle;

a main door mounted to normally prevent access to said region of said receptacle door; and a control mechanism that is operable automatically to enable access to said region of said receptacle door after said receptacle door has been moved to permit access to said interior of said target receptacle;

wherein said array of receptacles is disposed within a removable cartridge that is mounted to at least one wheel and configured so that said cartridge may be rolled into and out of operative engagement with said housing.

36. The apparatus of claim 35, wherein said removable cartridge may be rolled into and out of mechanical registration with said housing.

37. An apparatus for dispensing and receiving articles, said apparatus comprising:

a housing disposed on a surface, said housing defining a main door, said main door opening to expose a recess in said housing that is open to said surface and said main door defining one or more user doors;

a removable cartridge sized to fit in said recess, said removable cartridge defining one or more receptacles that are accessible through said user door or doors; and said removable cartridge being mounted on a rolling mechanism for movement along said surface from outside said recess into said recess and into a position in which said main door can be closed and in which said cartridge is positioned to align said receptacles with user door or doors.

38. A method of consecutively dispensing a first and a second article from a dispensing machine, said method comprising the steps of:

providing an array of receptacles including a first receptacle and a second receptacle, said first receptacle being separated from said second receptacle by at least a third access receptacle;

providing a first article within said first receptacle and a second article within said second receptacle;

providing a flexible receptacle door defining an access opening;

moving said flexible receptacle door into a first position in which said receptacle door permits access, through said access opening, to an interior portion said first receptacle;

allowing said first article to be removed from said first receptacle;

before any additional articles are dispensed from said dispenser, moving said receptacle door into a second position in which said receptacle door permits access, through said access opening, to an interior portion of said second receptacle; and allowing said second article to be removed from said second receptacle.

39. The method of claim 38, wherein said first article is dispensed through a first portion of said access opening, said first portion having a first width and wherein said second article is dispensed through a second portion of said access opening having a second width, said second width being wider than said first width.

40. The method of claim 38, wherein said first article is dispensed through a first portion of said access opening, said first portion having a first width and wherein said second article is dispensed through a second portion of said access opening, said second portion having a second width, said second width being narrower than said first width.

41. The method of claim 38, further comprising said step of providing a plurality of user doors disposed adjacent said receptacle door, said user doors being configured for controlling access to at least a portion of said receptacle door.

42. The method of claim 38, wherein said first article is dispensed through a first of said user doors.

43. The method of claim 42, wherein said second article is dispensed through a second of said user doors.

44. The method of claim 43, further including the steps of:

unlocking said first user door after said step of moving said receptacle door into said first position and before said step of moving said receptacle door into said second position; and unlocking said second user door after said step of moving said receptacle door into said second position.

45. The method of claim 43, further including the steps of:

unlocking said first user door after said step of moving said receptacle door into said first position and before said step of moving said receptacle door into said second position;

locking said first user door after said step of dispensing said first article;

unlocking said second user door after said step of moving said receptacle door into said second position; and locking said second user door after said step of dispensing said second article.

46. The method of claim 45, wherein said first article is dispensed through a first portion of said access opening, said first portion having a first width and wherein said second article is dispensed through a second portion of said access opening having a second width, said second width being wider than said first width.

47. The method of claim 45, wherein said first article is dispensed through a first portion of said access opening, said first portion having a first width and wherein said second article is dispensed through a second portion of said access opening, said second portion having a second width, said second width being narrower than said first width.

48. A method of dispensing articles, said method comprising the steps of:

providing an array of receptacles;

providing a receptacle door defining an access opening;

moving said receptacle door into a first position in which said receptacle door permits access to an interior portion of a first of said receptacles through said access opening;

moving said receptacle door in a first direction until said receptacle door is in a second position in which said receptacle door permits access to an interior portion of a second of said receptacles through said access opening; and after said step of moving said receptacle door in said first direction, moving said receptacle door in a second direction, opposite said first direction, until said receptacle door is in a third position in which said receptacle door permits access to an interior portion of a third of said receptacles through said access opening.

49. The method of claim 48, wherein said receptacle door comprises at least one sheet of flexible material and further including the step of providing a roller for moving said receptacle door relative to said array of receptacles.

50. A method of dispensing articles from a dispensing machine, said method comprising the steps of:

providing an array of receptacles for receiving articles to be vended;

providing a receptacle door disposed adjacent said array of receptacles, said receptacle door comprising at least one sheet of flexible material, said receptacle door being mounted for movement relative to said array of receptacles and defining a region that selectively allows access to an interior of one or more of said receptacles while simultaneously blocking access to an interior portion of the other receptacles in said array;

providing a "receptacle full" sensor for determining whether at least one of said receptacles contains an article to be dispensed from said dispenser;

determining, by said "receptacle full" sensor, that a target receptacle within said array of receptacles contains an article;

providing a drive apparatus for moving said receptacle door relative to said array of receptacles so that said receptacle door permits access to an interior of said target receptacle;

after said step of determining, by said "receptacle full" sensor that a target receptacle within said array of receptacles contains an article, moving said receptacle door relative to said array of receptacles so that said receptacle door permits access to an interior of said target receptacle;

providing a main door mounted to normally prevent access to said region of said receptacle door; and providing a control mechanism that is operable automatically to enable access to said region of said receptacle door after said receptacle door has been moved to permit access to said interior of said target receptacle.

51. The method of claim 50, further including the step of determining whether each receptacle within a row of said receptacles contains an article by moving said "receptacle full" sensor laterally along said row of said receptacles.

52. The method of claim 51, wherein said "receptacle full" sensor is disposed on said receptacle door.

* * * * *

UNITED STATES PATENT AND TRADEMARK OFFICE
CERTIFICATE OF CORRECTION

PATENT NO. : 6,502,718 B2
DATED : January 7, 2003
INVENTOR(S) : Fitzgerald et al.

It is certified that error appears in the above-identified patent and that said Letters Patent is hereby corrected as shown below:

Column 21,
Line 4, please replace "," with -- ; --.

Column 22,
Line 58, please insert -- said -- immediately after "with".

Column 23,
Line 5, please insert -- of -- immediately after "portion".

Signed and Sealed this

Thirteenth Day of May, 2003

JAMES E. ROGAN
*Director of the United States Patent and Trademark Office*